US011007984B2

(12) United States Patent
Belanger et al.

(10) Patent No.: US 11,007,984 B2
(45) Date of Patent: May 18, 2021

(54) VEHICLE WASH SYSTEM HAVING A VERTICALLY OPERATED TOP BRUSH WITH COLLAPSIBLE GUIDE TRACK SYSTEM

(71) Applicant: WashMe Properties, LLC, Northville, MI (US)

(72) Inventors: Michael J. Belanger, Northville, MI (US); Barry S. Turner, Novi, MI (US); David L. Tognetti, Howell, MI (US); Curtis S. Prater, Warren, MI (US)

(73) Assignee: Belanger, Inc., Northville, MI (US)

( * ) Notice: Subject to any disclaimer, the term of this patent is extended or adjusted under 35 U.S.C. 154(b) by 61 days.

(21) Appl. No.: 16/213,605

(22) Filed: Dec. 7, 2018

(65) Prior Publication Data

US 2019/0176776 A1     Jun. 13, 2019

Related U.S. Application Data

(60) Provisional application No. 62/596,005, filed on Dec. 7, 2017.

(51) Int. Cl.
*B60S 3/06* (2006.01)
*B08B 1/02* (2006.01)
(Continued)

(52) U.S. Cl.
CPC ............ *B60S 3/066* (2013.01); *A46B 7/10* (2013.01); *A46B 13/005* (2013.01); *A46B 13/02* (2013.01); *A46B 15/0004* (2013.01); *B08B 1/002* (2013.01); *B08B 1/02* (2013.01); *B60S 3/042* (2013.01); *B60S 3/06* (2013.01); *B60S 3/063* (2013.01); *B66F 7/0666* (2013.01); *A46B 2200/3046* (2013.01); *B08B 1/04* (2013.01); *B60S 1/00* (2013.01); *B60S 3/002* (2013.01); *B60S 3/004* (2013.01); *B64F 5/30* (2017.01); *H02K 9/28* (2013.01)

(58) Field of Classification Search
CPC ..... B60S 3/06; B60S 3/066; A46B 2200/3046
See application file for complete search history.

(56) References Cited

U.S. PATENT DOCUMENTS 2,610,342 A * 9/1952 Griffiths .................. B60S 3/066
                                                    15/53.3
3,304,565 A * 2/1967 Fuhring .................... B60S 3/06
                                                    15/53.2
3,410,284 A * 11/1968 Burger ...................... B60S 3/04
                                                    134/45

FOREIGN PATENT DOCUMENTS

GB          1 314 840    * 4/1973

* cited by examiner

*Primary Examiner* — Randall E Chin
(74) *Attorney, Agent, or Firm* — Dickinson Wright, PLLC

(57) ABSTRACT

A vehicle washing system includes a frame disposed above a vehicle treatment area, and a reciprocal guide system coupled to the frame. The guide system is configured to move vertically relative to the frame, and supports a vehicle treatment component such as a rotatable brush. The brush may be lowered and raised relative to the vehicle treatment area by extending or retracting the guide track. When the guide system is retracted upward, there are no downwardly extending guides or rails that extend downward from the bottom of the guide system. The guide system is collapsible in a vertical direction, and may be a scissors mechanism or a telescoping mechanism or other collapsible mechanism. The guide system may be actuated directly or may be actuated dependent on a separate vertical drive mechanism, such as a windable belt.

28 Claims, 30 Drawing Sheets

(51) Int. Cl.
  *B08B 1/00*   (2006.01)
  *A46B 7/10*   (2006.01)
  *A46B 13/00*  (2006.01)
  *A46B 13/02*  (2006.01)
  *B66F 7/06*   (2006.01)
  *A46B 15/00*  (2006.01)
  *B60S 3/04*   (2006.01)
  *B08B 1/04*   (2006.01)
  *B64F 5/30*   (2017.01)
  *B60S 1/00*   (2006.01)
  *B60S 3/00*   (2006.01)
  *H02K 9/28*   (2006.01)

VEHICLE WASH SYSTEM HAVING A VERTICALLY OPERATED TOP BRUSH WITH COLLAPSIBLE GUIDE TRACK SYSTEM

CROSS-REFERENCE TO RELATED APPLICATIONS

This application claims the benefit of previously filed U.S. Provisional Patent Application No. 62/596,005, filed Dec. 7, 2017, titled "An Improved Rollover Vehicle Wash System," the entire contents of which is hereby incorporated by reference in its entirety.

This application is related to co-filed United States Patent Applications, filed Dec. 7, 2018, with reference made to the TITLE and U.S. Application No., including: VEHICLE WASH SYSTEM HAVING A VERTICALLY OPERATED TOP BRUSH WITH PIVOTING ABILITY, U.S. application Ser. No. 16/213,675, filed Dec. 7, 2018; VEHICLE WASH SYSTEM WITH SIDE BRUSHES HAVING TWO OR MORE AXIAL ORIENTATIONS, U.S. application Ser. No. 16/213,968, filed Dec. 7, 2018; VEHICLE WASH SYSTEM WITH SIDE BRUSHES HAVING THREE OR MORE AXIAL ORIENTATIONS, U.S. application Ser. No. 16/213, 974, filed Dec. 7, 2018; VEHICLE WASH SYSTEM HAVING A VERTICALLY OPERATED TOP BRUSH WITH A SCISSOR SUPPORT MECHANISM, U.S. application Ser. No. 16/213,733, filed Dec. 7, 2018; VEHICLE WASH SYSTEM WITH PIVOTING SIDE BRUSHES AND METHOD FOR AVOIDING VEHICLE ANTENNA, U.S. application Ser. No. 16/213,983, filed Dec. 7, 2018; VEHICLE WASH SYSTEM WITH PIVOTING SIDE BRUSHES AND METHOD FOR AVOIDING VEHICLE SIDE MIRRORS, U.S. application Ser. No. 16/213,994, filed Dec. 7, 2018; VEHICLE WASH SYSTEM HAVING A MULTI-SPEED CAR WASH BRUSH, U.S. application Ser. No. 16/214,005, filed Dec. 7, 2018, and the entire contents of each of the above listed co-filed applications is hereby incorporated by reference in its entirety.

TECHNICAL FIELD

The present disclosure relates generally to a vehicle wash system for cleaning an exterior surface of a vehicle. More specifically, the present disclosure relates to a vehicle wash system having a vertically operated top brush with a collapsible guide track.

BACKGROUND

Vehicle wash systems are in common use to clean passenger vehicles such as automobiles. These vehicle wash systems may include a number of washing components that may be used to clean different sections of the vehicle. For example, wash systems may include a top brush that cleans the top surfaces of the vehicle and side brushes that clean the side surfaces of the vehicle. The top brush is typically raised and lowered relative to the vehicle to clean the varying heights inherent in the top surfaces of vehicles. The top brush may also be moved fore-and-aft to travel along the length of the vehicle, or the vehicle may be conveyed past the top brush to cover the length of the vehicle. The side brushes, similar to the top brush, may be translated fore-and-aft relative to the vehicle to cover the length of the vehicle, either by translating the brush relative to stationary vehicle, or conveying the vehicle past stationary brushes.

To adjust the height of the top brush with respect to a vehicle treatment area, the brush may be carried on a vertical rail system, with the brush extending horizontally between opposing rails. The rails are disposed on opposite sides of the vehicle, and the brush extends across the width of the vehicle between the rails. During vertical movement of the top brush, the brush will become in the path of the vehicle, either in front of or behind a portion of the vehicle. Accordingly, substantial damage to the brush and rails can occur in the event that the vehicle moves when the top brush is in a lowered position and in the path of the vehicle. Similarly, because the top brush is moved relative to the vehicle, either by translating the brush or conveying the vehicle, the top brush may collide with the vehicle in the event the vertical movement of the top brush is not controlled properly relative to the for-and-aft movement relative to the vehicle. Again such contact with the brush can cause significant damage to the top brush and/or rail system necessitating repair thereof and also causing significant down time of the wash system. Additionally, the rails of these prior systems are fixed and do not retract as the top brush retracts from the path of a vehicle. As such, they are susceptible to unwanted vehicle contact and thus damage. Moreover, because these top brush systems remain in a single vertical plane, they require an advanced control system, such as including torque sensors and feedback, to follow the contour of the car as the brush moves relative to the car.

In view of the above, there is a need for an improved vehicle wash system.

SUMMARY OF THE DISCLOSURE

It is therefore an aspect of the present disclosure to provide a vehicle wash system that minimizes damage to the system as well as vehicles that enter the wash.

It is another aspect of the present disclosure to provide a vehicle wash system that provides improved cleaning capabilities.

It is another aspect of the present disclosure to provide a vertical translation mechanism for a top brush of a vehicle wash system.

According to the above and other aspects, a vehicle washing system is provided. The vehicle wash system includes a frame disposed adjacent a vehicle treatment area configured to receive a vehicle to be cleaned, the frame configured to support one or more vehicle treatment components. A guide system is coupled to the frame, wherein the guide system is configured to move vertically with respect to the frame toward and away from the vehicle treatment area. A brush is coupled to the guide system such that the brush can be raised and lowered with respect to a vehicle in the vehicle treatment area as the guide system reciprocates, wherein the brush is rotatable about a central axis thereof.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE DISCLOSURE

The present disclosure relates to a vehicle wash system, which may be configured as a rollover type system where the vehicle remains stationary and the various treatment components may be translated and/or moved with respect to the vehicle to perform the vehicle wash process. As is known to one of ordinary skill in the art, a rollover wash system carries various components that treat a vehicle in a predetermined sequence as the rollover wash system makes passes over the length of a vehicle. It will be appreciated that various aspects, components, or portions of the disclosed vehicle wash system may be utilized or employed as part of a conveyor wash system where a vehicle is conveyed past stationary wash components to treat the vehicle exterior as it travels through the wash facility. It will be appreciated that the various aspects, components, or portions of the disclosed vehicle wash system may be employed in connection with a variety of other applications outside of a rollover or conveyor vehicle wash system, such as a manual wash or self-service wash process.

Figure 1:
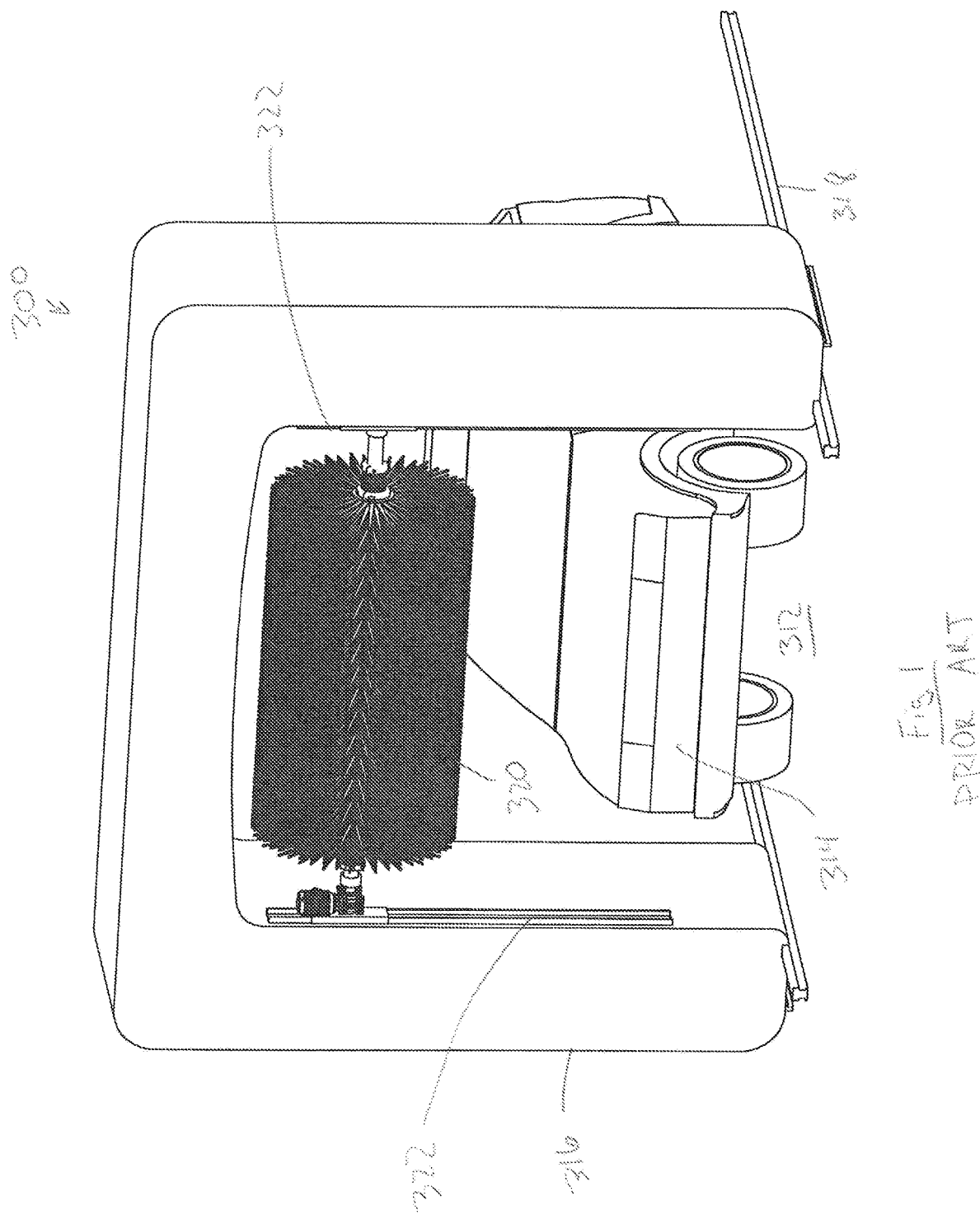
FIG. 1 illustrates a prior art wash system with a top brush that is moveable along vertically mounted rails with the top brush in an upper position.
Figure 2:
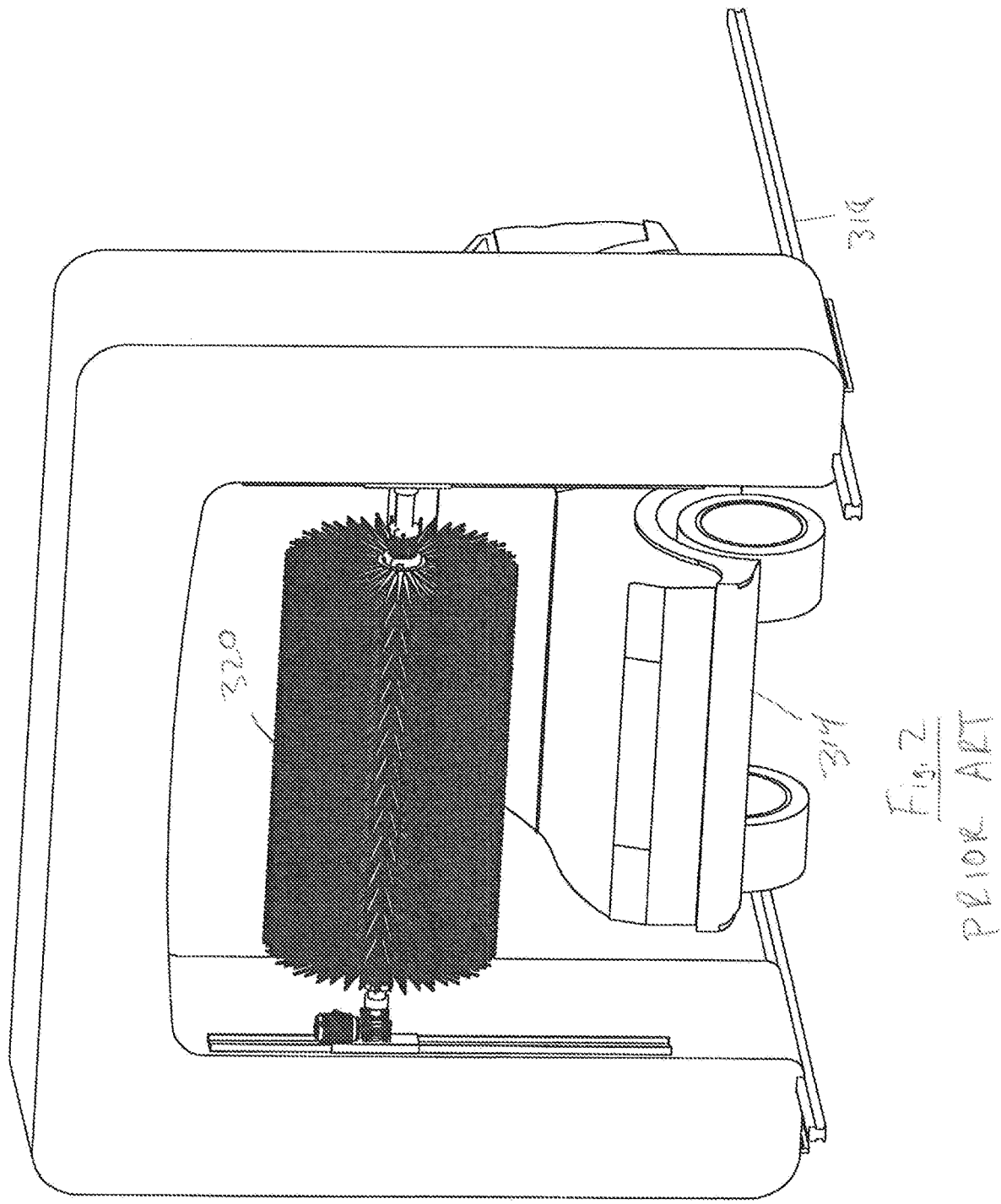
FIG. 2 illustrates the prior art system of FIG. 1, with the top brush in a middle position.
Figure 3:
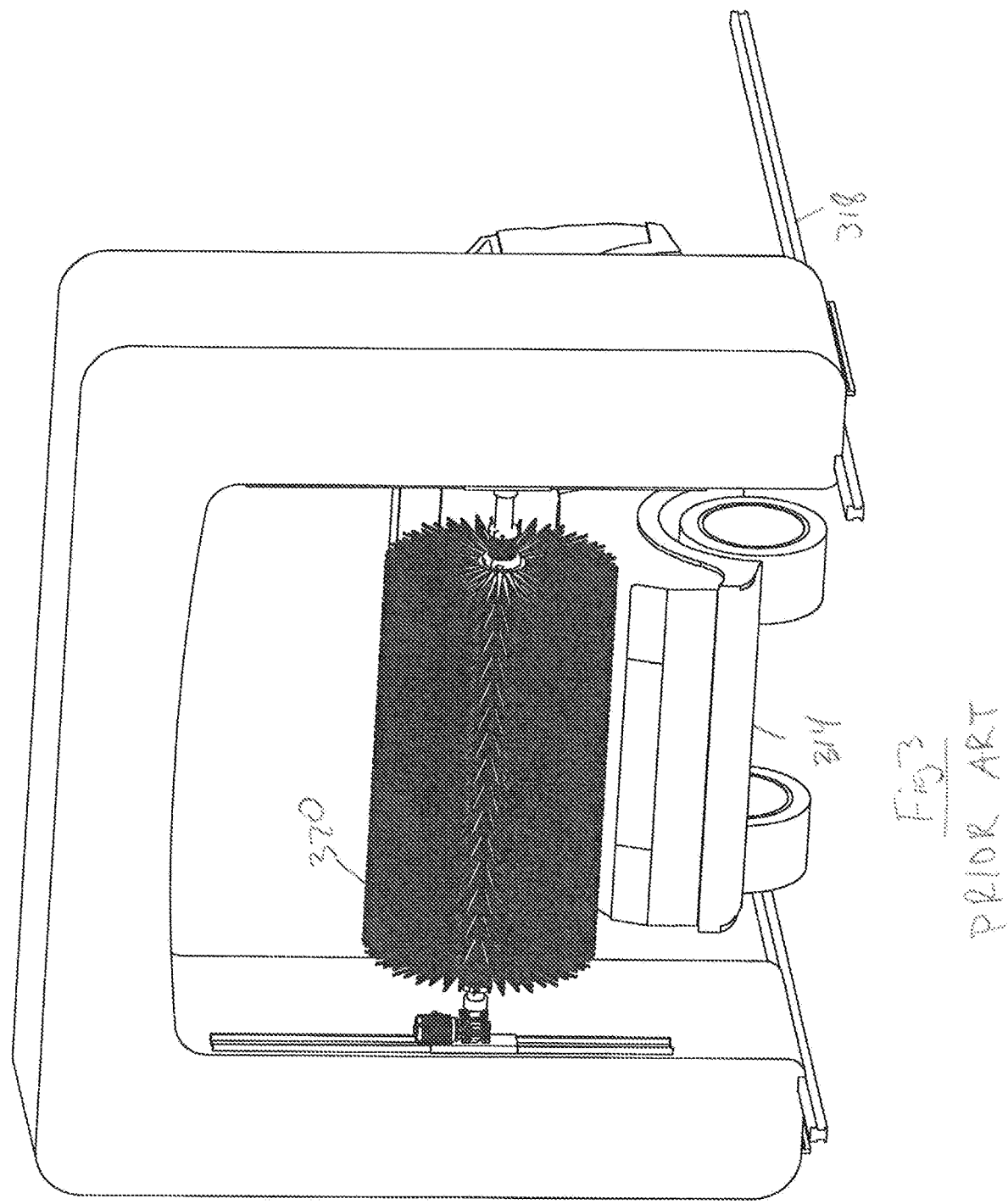
FIG. 3 illustrates the prior art system of FIG. 2, with the top brush in a lower position.

FIGS. 1-3 illustrate a prior art vehicle wash system 300, which includes a vehicle treatment area 312 where a vehicle 314 is to be position in a vehicle wash for treatment thereof. As shown, the wash system 300 includes a frame 316 supported on a horizontal rail system 318, such that the frame 316 may reciprocate forwardly and rearwardly on the rail system 318 to travel over the length of the vehicle treatment area 312 and the vehicle 314 therein. As shown in FIGS. 1-3, the rail system 318 is in the form of ground engaging rails, and the frame extends upwardly from the rail system 318 and passes over the top of the vehicle treatment area 312.

The frame 316 may include various vehicle treatment components supported thereon, such as a top brush 320 oriented generally horizontal to the ground and disposed for treatment of an upper surface of the vehicle 312. The frame 316 may include a pair of vertical rails 322 attached at laterally opposite sides of the frame 316. The rails 322 may support a horizontal shaft 324 that extends laterally between the rails 322 and that supports the top brush 320 for rotation. The top brush 320 is vertically moveable along the rails 322 in order to be disposed at different vertical heights relative to the vehicle treatment area 312 and the vehicle 314 disposed therein under direction of a control system in cooperation with various feedback devices such as a torque sensor.

FIG. 1 shows the top brush 320 in an upper position, in which the top brush 320 may be passed over the top of the vehicle 314 by translating the frame 316 rearward. Similarly, in this position, the vehicle 314 may pull forward through the frame 316 and under the top brush. In this position, there is a reduced likelihood of damage to the vehicle 314 or the top brush 320, because the vehicle 314 may pass the top brush 320 without contacting any rigid structure.

FIG. 2 shows the top brush in a middle position, in which the top brush 320 has been lowered relative to the top position, and may be in line with the vehicle windshield. In this position, there is an increased likelihood of damage to the vehicle 314 or the top brush 320 in the event the vehicle 314 or brush 320 are moved horizontally toward each other, because the shaft or other support structure of the brush 320 may impact the top of the vehicle 314.

FIG. 3 shows the top brush 320 in a lower position, in which the top brush 320 is vertically aligned with a front portion of the vehicle. In this position, there is a high likelihood of damage to the brush 320 and vehicle 314 if the vehicle 314 pulls forward or if the brush 320 is moved rearward and is not raised in accordance with the top contour of the vehicle 314.

FIGS. 1-3 illustrate an example of a rollover type wash system, but the above use of the vertical rails 322 and the top brush 320 are also known to be applied to conveyor type systems in which the vehicle 314 is moved past a horizontally stationary top brush 320. The top brush 320 must still be controlled to be raised and lowered according to the vehicle contour, and there is an increased potential for damage if the vehicle 314 is conveyed into the brush 320 when it is in a lowered position relative to the top position.

With reference to FIGS. 4-21, according to an aspect, the disclosed vehicle wash system 10 includes a vehicle treatment area 12 where a vehicle 14 is to be positioned in a vehicle wash for treatment thereof. As shown, the wash system 10 can include a frame 16 disposed adjacent the vehicle treatment area 12. According to an aspect, the frame 16 may be supported on an overhead rail system 18 such that the frame 16 may reciprocate forwardly and rearwardly on the overhead rail system 18 in order to travel over the length of the vehicle treatment area 12 and the vehicle 14 therein. According to one aspect, the frame 16 does not travel on ground engaging rails. The frame 16 may also support a plurality of treatment components configured to treat an exterior surface of the vehicle 14. According to an aspect as shown in the Figures, the frame 16 may support a top brush 20 oriented generally horizontal to the ground and extending laterally across the vehicle treatment area 12 and disposed for treatment of an upper surface of the vehicle 14. The frame 16 may also support a pair of side brushes (not shown) configured to travel along and treat either side of a vehicle 14 in the vehicle treatment area 12. The pair of side brushes can be oriented generally perpendicular to ground.

The frame 16 may carry a variety of other or different treatment components, such as foam nozzles and fluid nozzles, which can emit foam or high pressure fluid onto both the top and sides of the vehicle 14 in the vehicle treatment area 12. It will further be appreciated that the frame 16 may carry or support a variety of other or different vehicle treatment components. The frame 16 may also have a variety of different configurations and may be supported in a variety of suitable ways. It will be appreciate that the frame can be eliminated and that the top brush and other components could be supported in a variety of other suitable ways. The foam nozzles and the fluid nozzles, and other vehicle treatment components attached to the frame 16 may have a variety of different configurations.

According to an aspect, the disclosed vehicle wash system 10 can provide improved cleaning capabilities without yielding a significant increase in the time of the wash process. According to a further aspect, the disclosed vehicle wash system 10 can provide a decrease in the time required to effectuate a vehicle wash process as compared to prior rollover wash systems. The vehicle wash system 10 can include a control system 30 that is in communication with the frame 16 and the various wash components to effectuate the vehicle cleaning process. According to an aspect, the control system 30 can include an electronic motor controller, a programmable logic controller and a communication network on which all of the components can communicate. According to another aspect, the communication network may be an Ethernet network. It will also be appreciated that the communication network can be configured such that the components communicate on a wireless network. It will be appreciated that the control system 30 can include a variety of other components. The control system 30 can thus allow the various components on the system to talk to one another. The control system 30 can also allow for the generation of e-mails and other notifications that can be delivered, including to the operator of the vehicle wash, such as to advise of any faults with the system.

Figure 4:
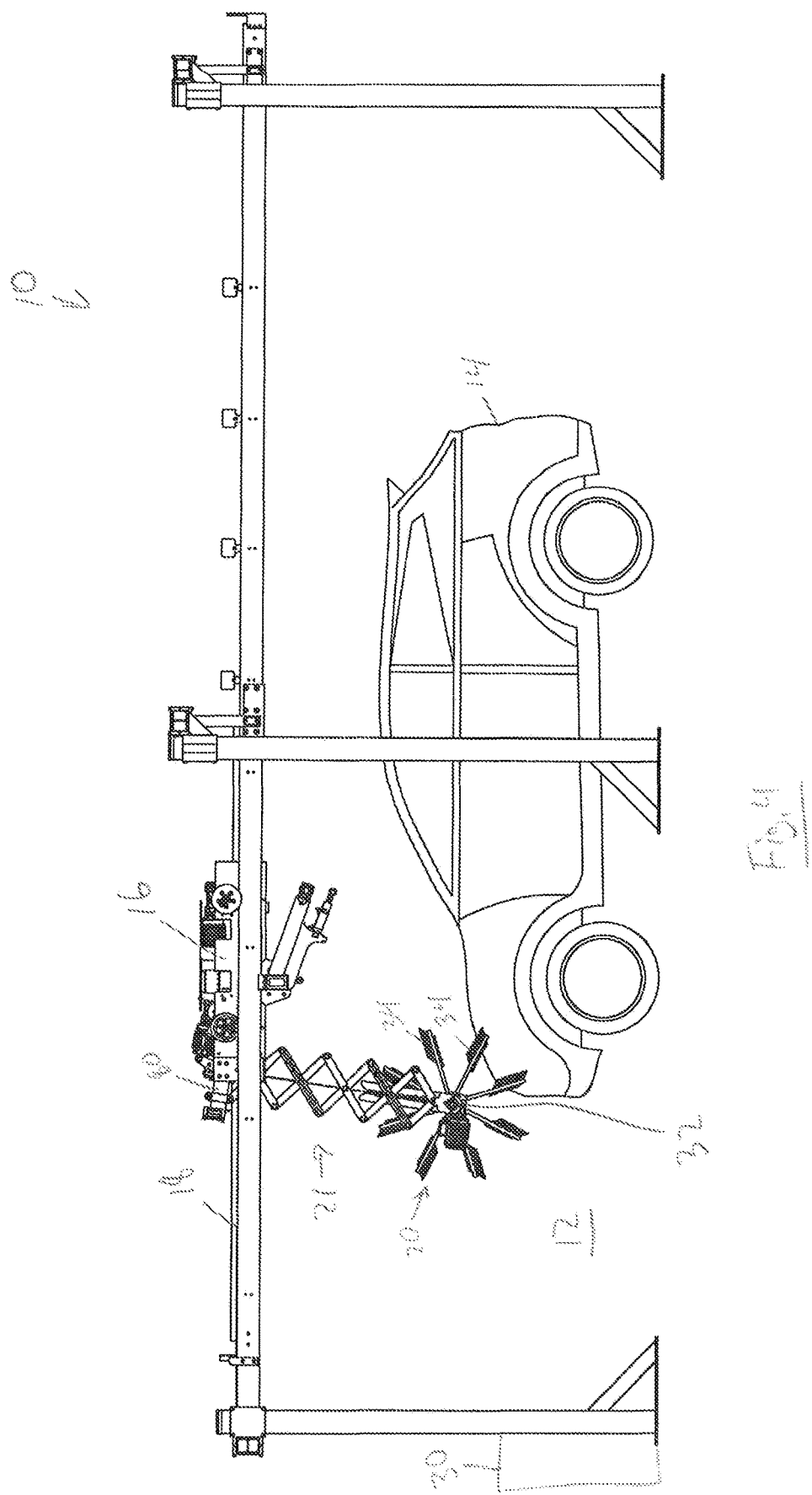
FIG. 4 illustrates a vehicle wash system with a vehicle disposed within a vehicle treatment area, a frame supported on elevated rails and disposed above the vehicle treatment area, and a top brush attached to the frame via an adjustable support structure that extends downward from the frame, with the top brush in a pivoted position according to an aspect of the present disclosure.

According to an aspect, the top brush 20 can include a hub portion 32 and a plurality of wash media elements 34, as shown in FIG. 4, disposed around and in communication with the hub portion 32. Each hub portion 32 may be in communication with an axle that is secured to or otherwise coupled to the hub portion 32 to effect rotation thereof. Preferably, the plurality of wash media elements 34 are coupled to or secured to the hub portion 32. The drive axle may be in communication with a power source such as a motor. It will be appreciated that a variety of suitable power sources may be employed to effect rotation of the top brush 20. According to an aspect, the wash media elements 34 may be constructed of an EVA foam and may be generally self-supporting along their length. An exemplary media element is disclosed in U.S. Pat. No. 8,990,993, which is owned by the Assignee of the present application. It will be appreciated that the wash media elements 34 may have a variety of different shapes and configurations and may be constructed from a variety of different materials.

According to a further aspect, the system as an initial step may determine a profile of the vehicle 14 in the vehicle treatment area 12 to be washed. It will be appreciated that this profiling of the geometry of the vehicle 14 may be accomplished in a variety of ways, including by employing a variety of sensors or other detection devices. According to an aspect, the geometric profiling may be accomplished in an initial pass of the frame 16 over the vehicle 14. It will also be appreciated that the geometric profiling can be accomplished in a variety of different ways or by multiple passes of the frame 16 over the vehicle 14. According to a further aspect, the geometric profiling can be accomplished when the vehicle enters the vehicle wash facility or the vehicle treatment area to eliminate a preliminary mapping or profiling pass of the frame 16.

According to an aspect, once the vehicle exterior has been mapped by the control system 30, it can use this information to dynamically increase the travel speed of the frame along the overhead rail system 18 as appropriate to speed up the wash process. With a roll over wash system, speed of the process is important as, the shorter the wash process, the more processes that can be completed in a given day, which means more revenue for a wash operator.

According to an aspect, with the mapped vehicle exterior, the control system 30 can divide the vehicle into individual segments and then can adjust the position of the top brush 20 and its travel speed. As discussed in more detail in Applicant's concurrently filed patent application entitled "VEHICLE WASH SYSTEM HAVING A MULTI-SPEED CAR WASH BRUSH", which is hereby incorporated by reference as though set forth fully herein. According to an aspect, the control system 30 can also vary or adjust the rotational speed of the top brush 20 based on its location with respect to certain vehicle segments. Thus, the linear movement speed of the components and their rotational speed can be dynamically varied depending upon vehicle geometry and other factors. It will also be appreciated that different types of vehicles can have different segments. Exemplary segments can include the following: (i) hood, (ii) windshield; (iii) roof; (iv) rear window. The control system 30 can obviously take into account a variety of other segments.

According to another aspect as shown for example in FIGS. 12-21, the top brush 20 may be supported by the frame 16 to allow for more accurate following of a top exterior surface of a vehicle 14 to provide improved cleaning. The top brush 20 may also be in communication with the control system 30 so the top brush may be properly located vertically with respect to an upper profile of the vehicle 14. As shown throughout the Figures, and in particular FIGS. 22-30, the top brush 20 may be supported on a linearly adjustable frame 21, which may also be referred to as a linear frame 21 or linear extension mechanism 21 or vertical translation mechanism 21, which allows for vertical movement of the top brush 20 relative to the frame 16. This allows the top brush 20 to be lowered and raised vertically by a control motor 122, which may be in communication with the control system 30. The top brush 20 may also be raised and lowered by a control means other than a motor.

The linear frame 21 may be pivotally attached to an overhead portion of the frame 16 such that it may swing or move forward and backward (in the direction of vehicle travel). This multiple degrees of travel provides improved safety and minimized damage to the top brush 20. If a vehicle were to bump the top brush 20, the linear frame 21 can swing without damage to itself or the top brush 20. The linear frame 21 may have various forms that permit the top brush 20 to be raised and lowered in a controlled manner. It will be appreciated that the reference to vertical movement corresponds to the arrangement in which the top brush 20 moves in a vertical direction when it is raised and lowered, and in the event the linear frame 21 is tilted relative to vertical, that the vertical movement will not be vertical, but will travel along the angle of tilt.

With reference to FIGS. 13 and 22-28, according to an aspect, an exemplary linear frame 21 for the top brush 20 may be a scissor support mechanism 60. As shown in the drawings, the scissor support mechanism 60 can include a first scissor arm 62 located on one side of the vehicle treatment area 12 and a second scissor arm 64 located on the other side of the vehicle treatment area 12. Each scissor arm 62, 64 is identical and thus only one arm is discussed specifically as that description applies equally to both.

According to an aspect, each scissor arm 62, 64 may be secured to pivoting frame portion 80, which may be pivotally secured to an overhead portion of the frame 16 at an upper pivot point 66. Thus, the pivoting frame portion 80 may pivot relative to the frame 16 via the pivot point 66. The scissor arms 62, 64 may be extended and retracted in a linear direction relative to the pivoting frame portion 80. In that sense, the pivoting frame portion 80 and the arms 62 and 64 remain in linear relationship with each other, with both the pivoting frame portion 80 and the arms 62 and 64 being ultimately pivotable relative to the frame 16.

Each arm 62, 64 can include a first set of links 68 and a second set of links 70 that are mirror images of one another. The first set of links 68 may include inner links 68a and outer links 68b. According to an aspect, the inner and outer links 68a and 68b may cross over each other, connect to each other at a middle area, and may also connect end to end with each other. For example, for one inner link 68a, an upper end is connected to a lower end of an upper adjacent outer link 68b, a lower end is connected to an upper end of a lower adjacent outer link 68b, and a middle area is connected to a middle area of centrally adjacent outer link 68b. These connections are pivotable connections. Similar connections are made for the second set of links 70, which include inner links 70a and outer links 70b. The connections may be described as end connections 72 and middle connections 88.

According to an aspect, the ends of the links in the first set and the second set of links 68, 70 may be connected to one another by an axle 76 to allow the scissor arms to expand and retract and to space the first set of links 68 from the second set of links 70. The first set of horizontal links 68 and the second set of horizontal links 70 may be spaced apart from one another such that each scissor arm 62, 64 has an interior space 78 between the links 68 and 70.

Figure 22:
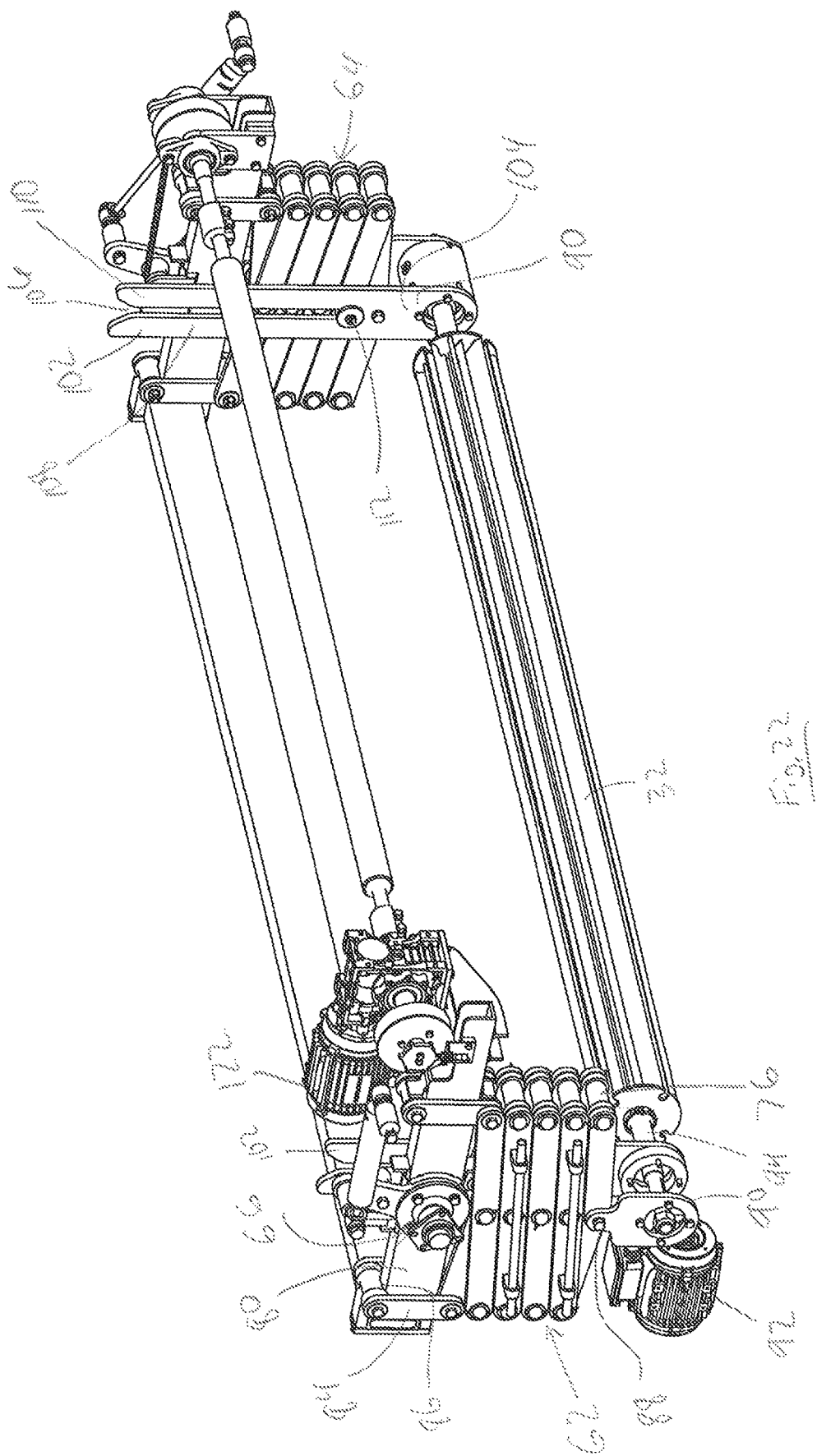
FIG. 22 illustrates a vertical translation mechanism for the top brush shown in a retracted configuration according to an aspect of the present disclosure.
Figure 28:
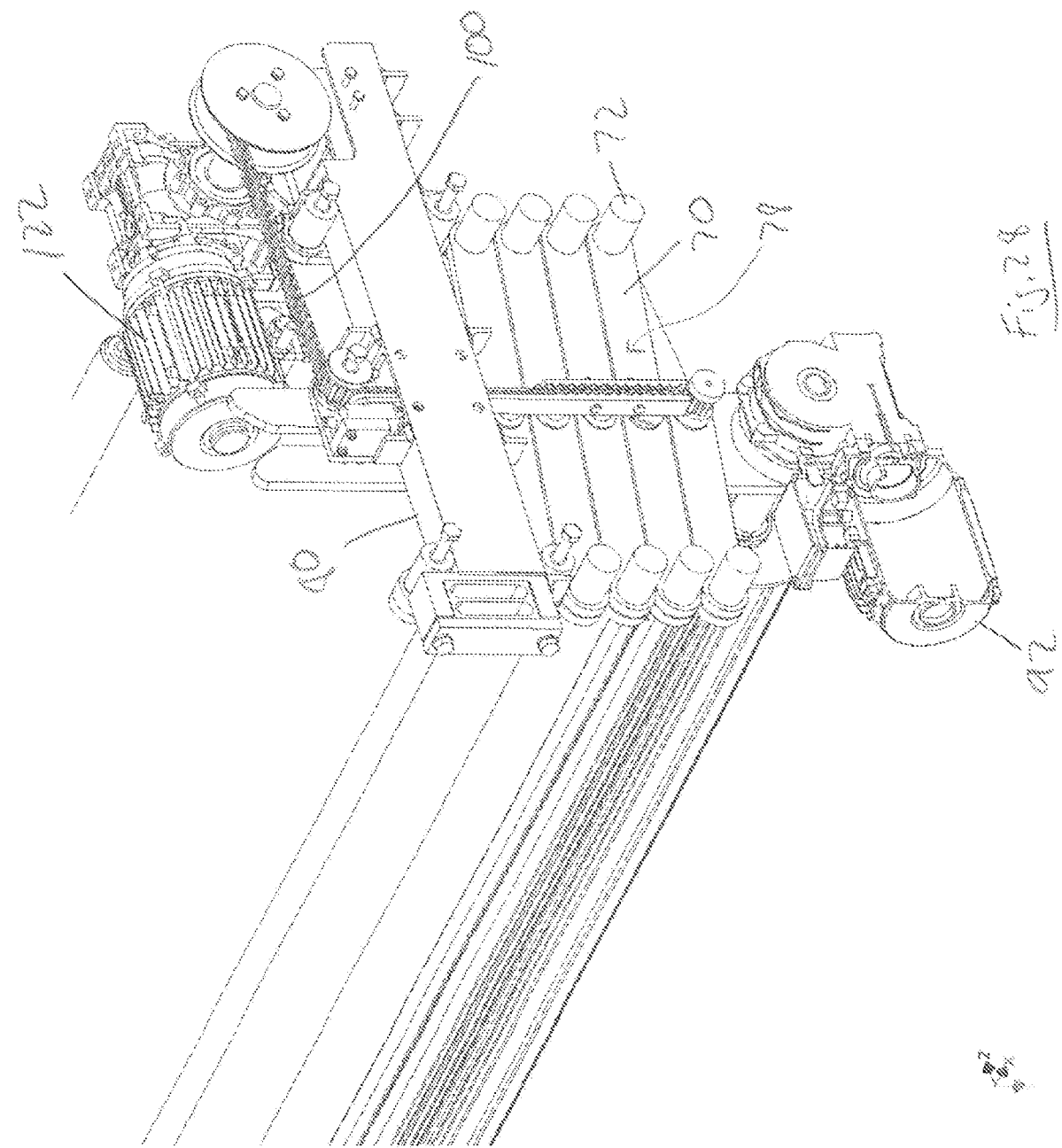
FIG. 28 illustrates a partial view of the vertical translation mechanism in a retracted position relative to FIG. 27.

In the retracted position, shown in FIGS. 22 and 28, the top brush 20 can be removed upwardly away from potential contact with a vehicle exterior. Throughout travel, the inner links 68a and 70a may be parallel to each other, and the outer links 68b and 70b may be parallel to each other. When fully retracted, the inner links 68a and outer links 68b can be oriented at an acute angle relative to each other. When expanded, the relative angle increases, as shown in the progression from FIGS. 22-24.

Figure 23:
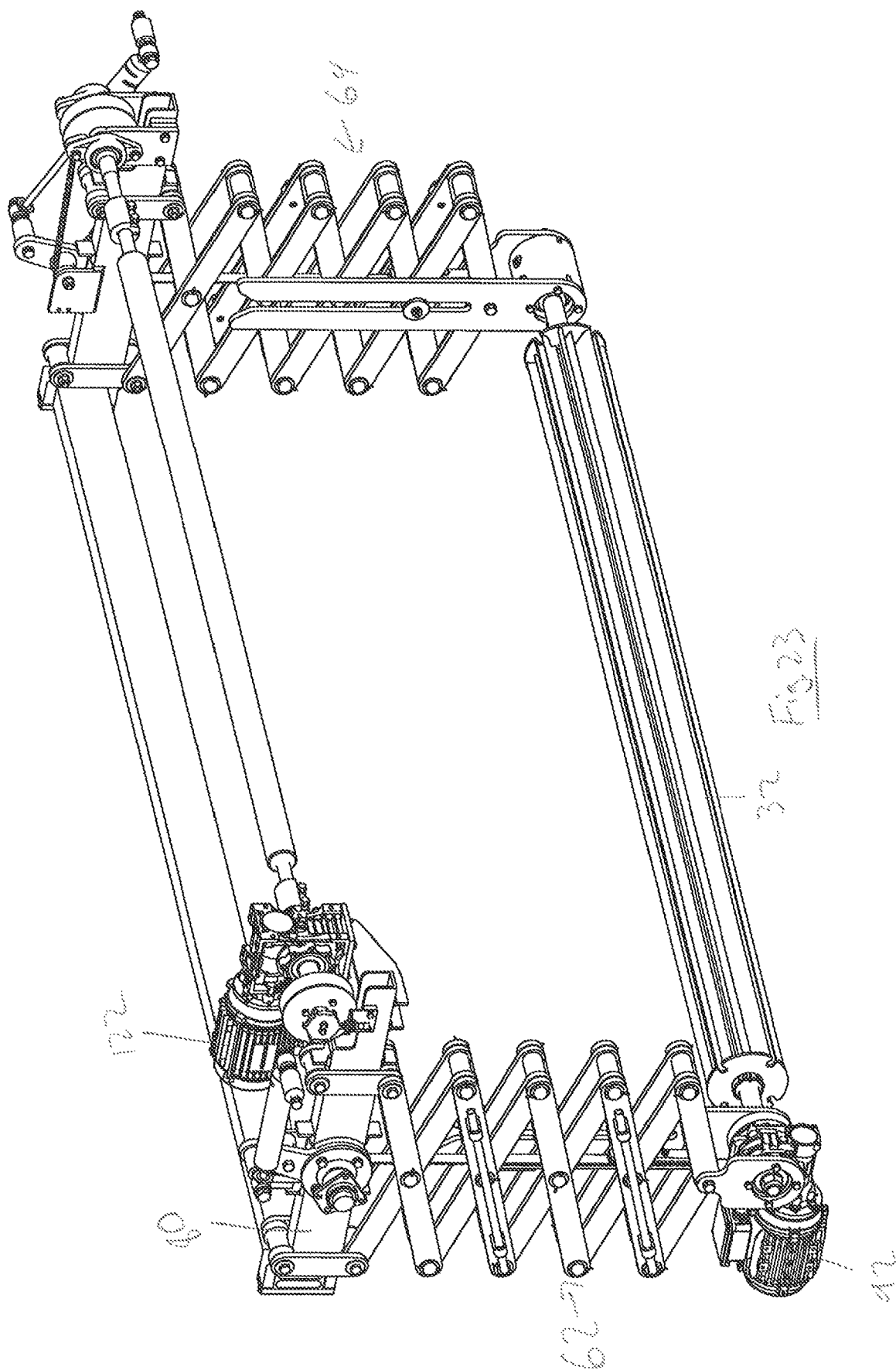
FIG. 23 illustrates the vertical translation mechanism in an extended position relative to FIG. 22.
Figure 24:
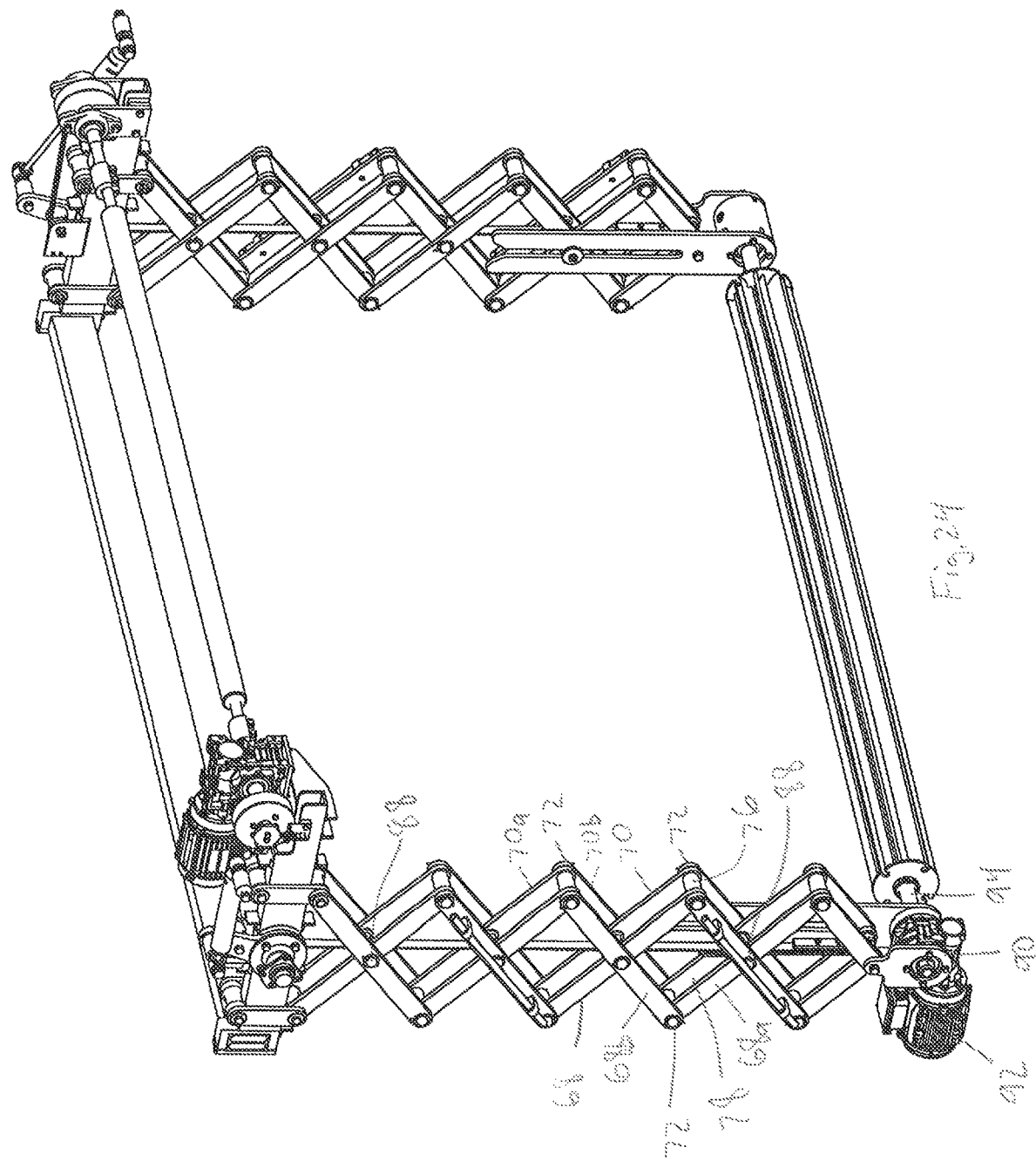
FIG. 24 illustrates the vertical translation mechanism in an extended position relative to FIG. 23.
Figure 25:
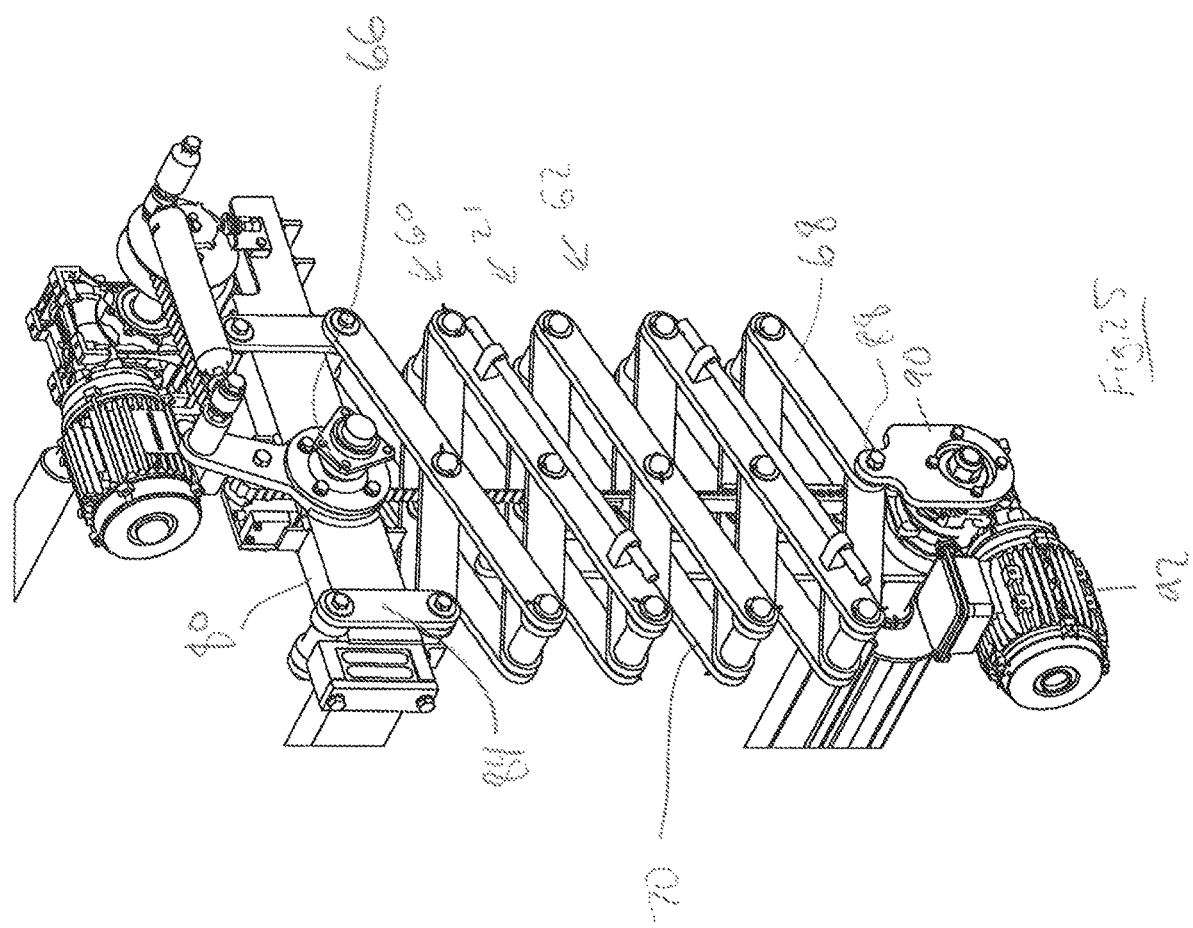
FIG. 25 illustrates one side of the vertical translation mechanism in a partially extended position according to an aspect of the present disclosure.
Figure 26:
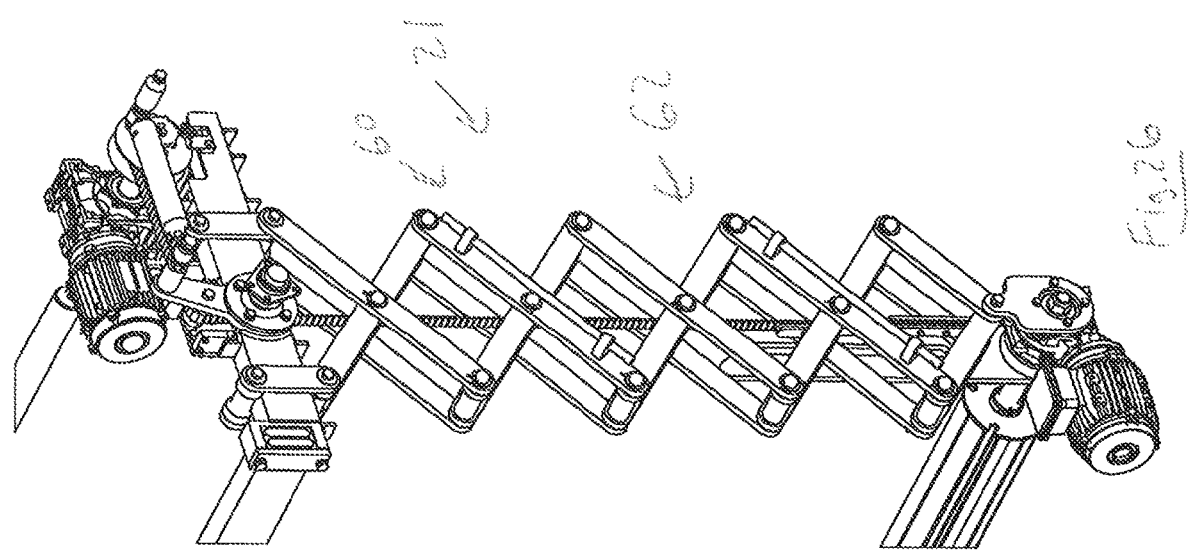
FIG. 26 illustrates the vertical translation mechanism in an extended position relative to FIG. 25.

As will be appreciated, the first scissor arm 62 and the second scissor arm 64 may be in communication with the drive motor 122 that is in communication with the control system 30 to move the scissor support mechanism 60 between the retracted and the expanded position, as shown in FIGS. 22-24. According to an aspect, the drive motor 122 can be actuated by the control system 30 based on the type of vehicle 14 in the vehicle treatment area 12 as well as based on the mapping of the vehicle profile. It will be appreciated that the drive motor can be controlled in a variety of other suitable ways.

As the top brush 20 is lowered, the first scissor arm 62 and the second scissor arm 64 expand and the links of the sets of links 68, 70 move apart from one another. As each scissor arm 62, 64 expands its width decreases (compared to the fully retracted position) as the top brush 20 is lowered. As shown, each scissor support arm 62, 64 may be secured to pivoting frame member 80, which may be pivotally secured to the frame 16 at pivot point 66. Each support arm 62, 64 may be supported on a respective member 80 by a pair of vertical links 84. The vertical links 84 have a bearing surface 86 that engages an upper surface of the member 80. This arrangement between the member 80 and the bearing surfaces 86 of the vertical links 84 may allow the vertical links 84 to slide along the member 80 as the support arms 62, 64 expand and retract. This serves to keep the center of the each support arm 62, 64 and thus the top brush 20 in the same vertical plane as it moves up and down. This arrangement provides a floating connection between the scissor support mechanism 60 and the frame 16, which, in turn, allows each support arm 62, 64 to self-center on their respective member 80. This floating arrangement of the scissor support mechanism 60 and the frame 16 can serve to minimize stress on the top brush 20. It will be appreciated that the links 84, the scissor support mechanism 60 and pivot pin 66 can have a variety of different configurations.

The linear frame 21 in the form of the scissor support mechanism 60 has been described and illustrated as being pivotable relative to the frame 16. However, it will be appreciated that the linear frame 21 may be secured to the frame 16 in a non-pivotable manner, as well. The pivot mechanism between the member 80 and the frame 16 may be locked or otherwise fixed to the frame 16, or the linear frame 21 may be secured to the frame 16 without interposition of the member 80. The ability of the linear frame 21 to expand and retract relative to the frame 16 may be accomplished as described herein without pivoting, if desired. It will also be appreciated that the linear frame may have a variety of different forms and configurations, including as discussed herein.

According to an aspect, a brush support flange 90 is secured at a lower end of each of the support arms 62, 64. Specifically, the brush support flange 90 may be secured to the middle connection 88 of the bottom two links of each of the first and second sets of links 68, 70. The top brush 20 is rotatably secured to the brush support flange 90 disposed on each support arm 62, 64 such that the top brush 20 may be rotated with respect to the support arms 62, 64. Also, because the weight of the top brush 20 is carried by the brush support flange 90, the weight is not supported directly by the first and second scissor arms 62, 64. A top brush motor 92 may also be supported by the brush support flange 90 such that the top brush motor 92 is raised and lowered with the top brush 20. According to an aspect, the top brush motor 92 is in driving communication with an axle 94 that is rotatably secured to the brush support flange 90 to effect rotation of the top brush 20.

Figure 27:
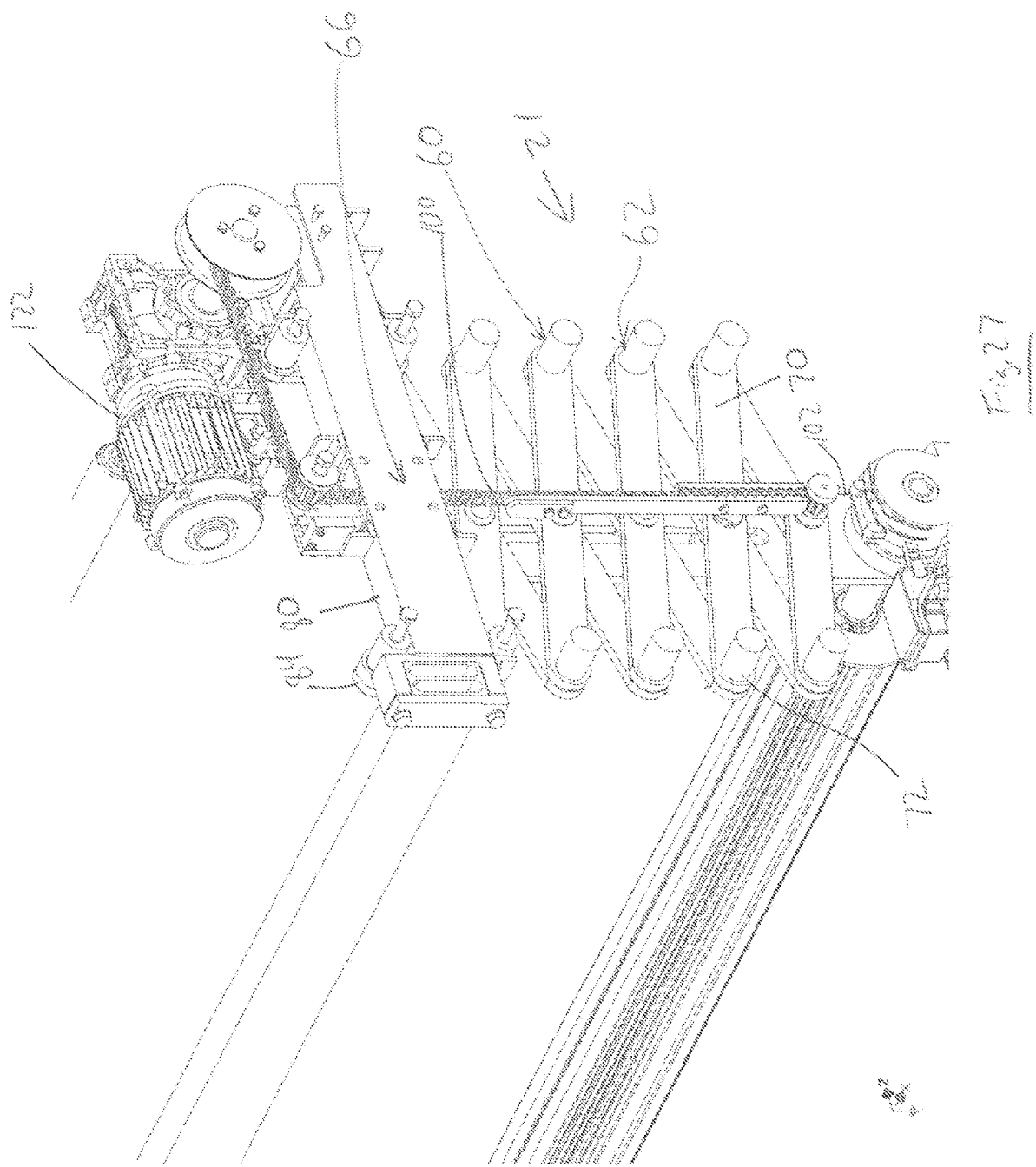
FIG. 27 illustrates a partial view of the vertical translation mechanism according to an aspect of the present disclosure.

With reference to FIGS. 27 and 28, according to another aspect, a belt support member 100 is in communication with a drive motor 122 to effect raising and lowering of the top brush and the retraction and expansion of the first and second scissor arms 62, 64. The belt support member 100 includes an upper end that is in communication with the drive motor 122 to effect retracting and unwinding of the belt support member 100. The lower end of the belt support member 100 may be connected to the brush support flange 90 such that as the belt support member 100 is retracted and applies an upward force on the brush support flange 90 to retract the scissor arms 62, 64 and thus raise the top brush 20. The belt support member 100 may be attached to the middle connection 88 at the bottom of the links, which is connected to the flange 90. Similarly, as the belt support member 100 is unwound, the brush support member 100 can move downward, which expands the scissor support arms 62, 64 and thus lower the top brush 20. As shown, the belt support member 100 may be disposed within the interior space 78 of each scissor arm 62, 64. Due to the self-centering of the scissor arms 62, 64, the belt support member 100 can also remain generally centered within the interior space 78.

In another aspect, the scissor mechanism 60 may be raised and lowered via a linear actuator, such as a telescoping member or via one or more motors coupled directly to the links of the scissor support mechanism 60.

According to an aspect, the arrangement and connection of the top brush 20 to the frame 16 yields a connection without permanent or downwardly extending vertical rails. Instead, the scissor arms 62, 64 act as guides to raise and lower the top brush 20. When the scissor arms 62, 64 are retracted, there are no downward hanging guides or rails into which a vehicle can bump or damage when it is pulling into the vehicle treatment area 12, which yields significant advantages over current rollovers with permanent downwardly extending guides. This also serves to minimize downtime of the wash system 10 and any lost revenue associated with that downtime.

According to an aspect, the linear frame 21 described above in the form of the scissor support mechanism 60 may also be in the form of other linearly extending support mechanisms that can be controlled to extend and retract relative to the pivot frame member 80 or the frame member 16. Put another way, the linear frame 21 does not need to be in the form of the scissor support mechanism 60. It can obvious take on a variety of different configurations.

Figure 5:
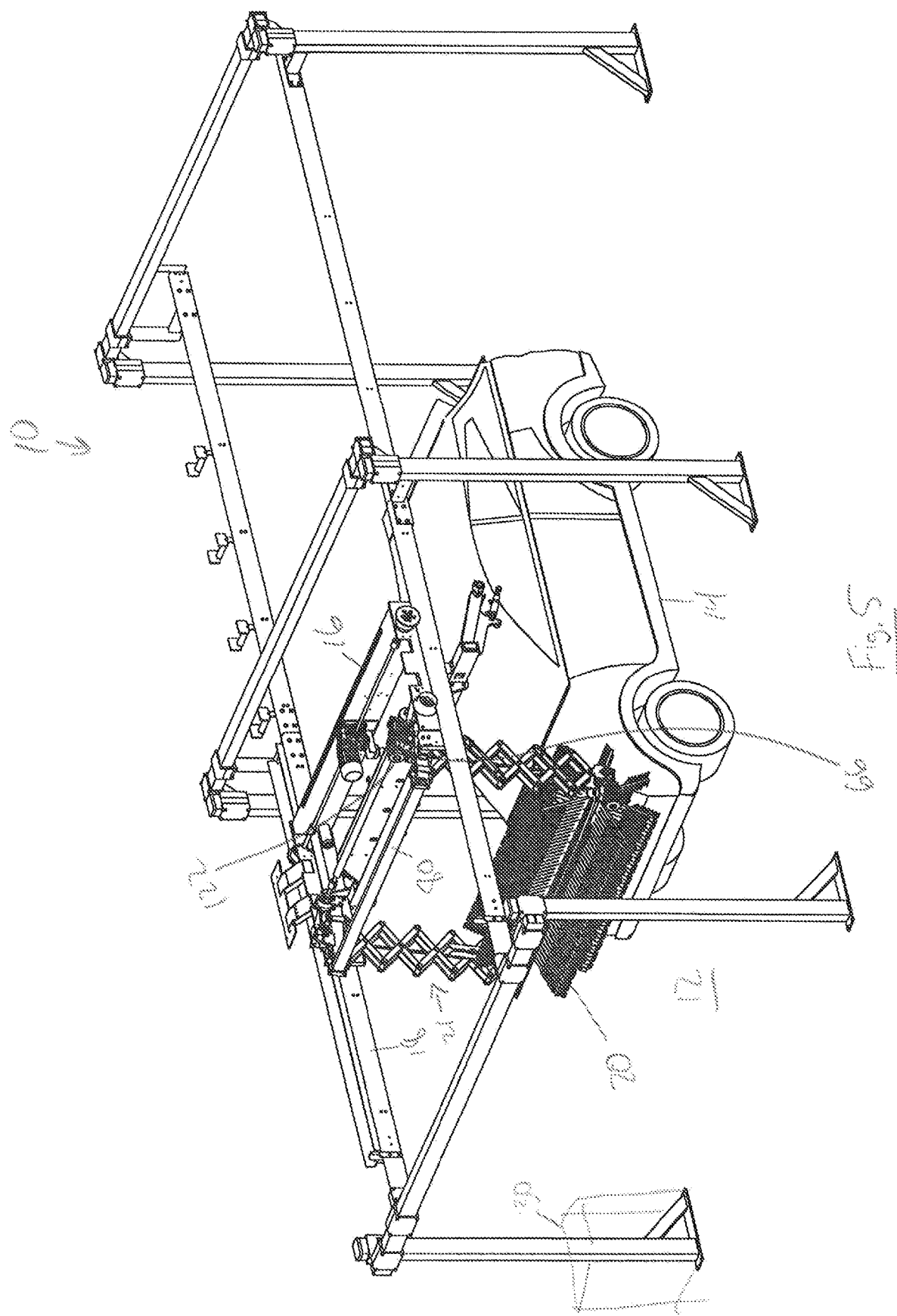
FIG. 5 illustrates a perspective view of the system in the same state as FIG. 4.

In the case of the pivotable linear frame 21, such a configuration allows for a system that is resistant to damage in the event of vehicle pull through while the top brush 20 is in an extended position and lowered position. An example of the vehicle 14 pulling out of the vehicle treatment area 12 is shown in FIGS. 4-11. As shown in FIGS. 4 and 5, the vehicle 14 is in a position in the middle of the vehicle treatment area 12, and the top brush 20 is in an extended and lowered position and in the path of the vehicle 14. The top brush 20 is making contact with the front of the vehicle 14, which can be the result of the vehicle 14 moving forward or the brush 20 moving rearward.

FIGS. 4-21 illustrate various extended and retracted positons of the linear frame 21, and illustrate how there is no downwardly extending guides or rails or other structure that extend below the top brush 20. FIGS. 4-21 also illustrate the linear frame 21 in various pivoted or vertical positions. As described above, the linear frame 21 may still beneficially operate without pivoting.

Figure 6:
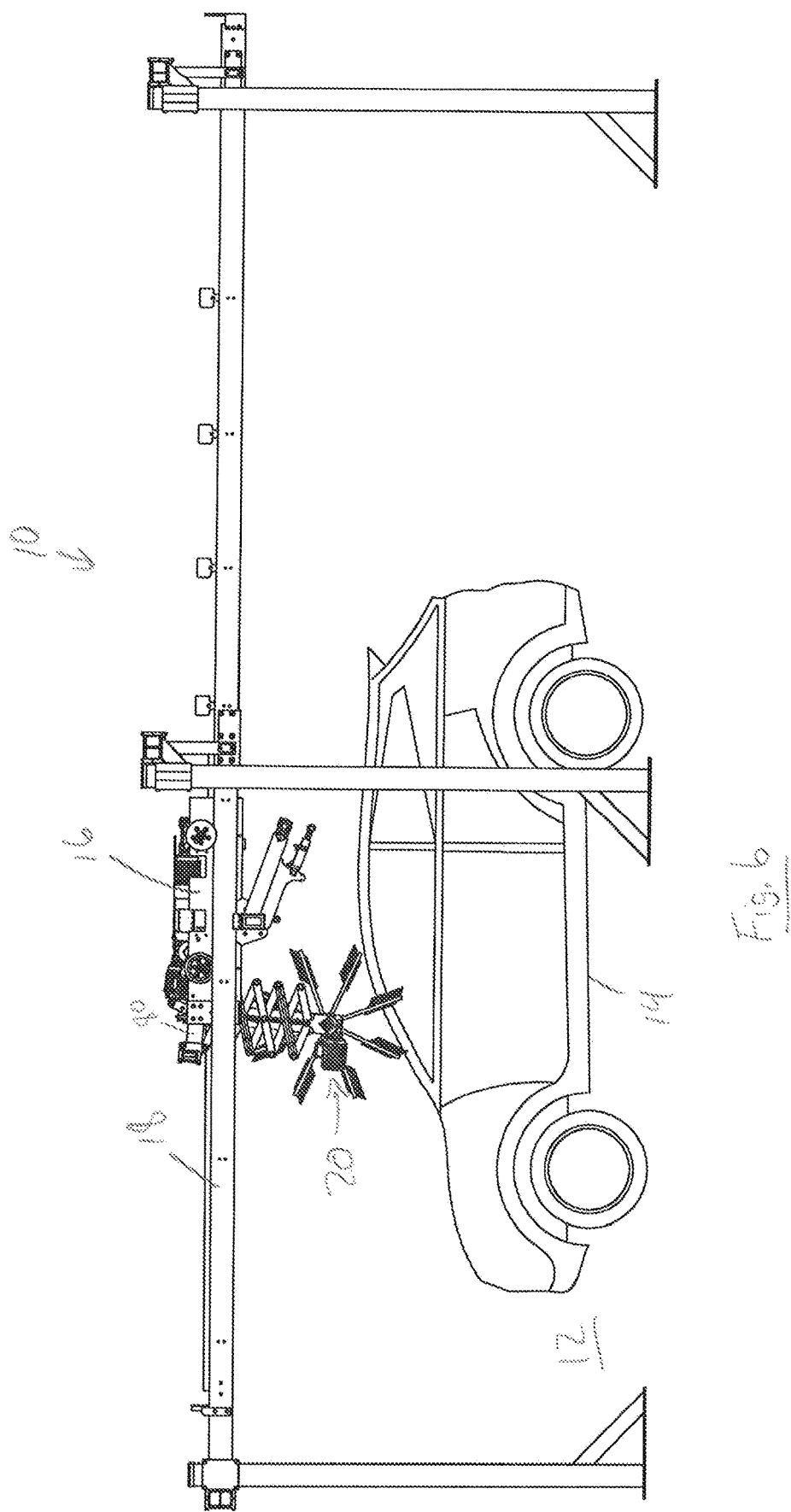
FIG. 6 illustrates the vehicle wash system, with the top brush retracted partially and pivoted, the frame moved rearward, and the vehicle pulling forward according to an aspect of the present disclosure.
Figure 7:
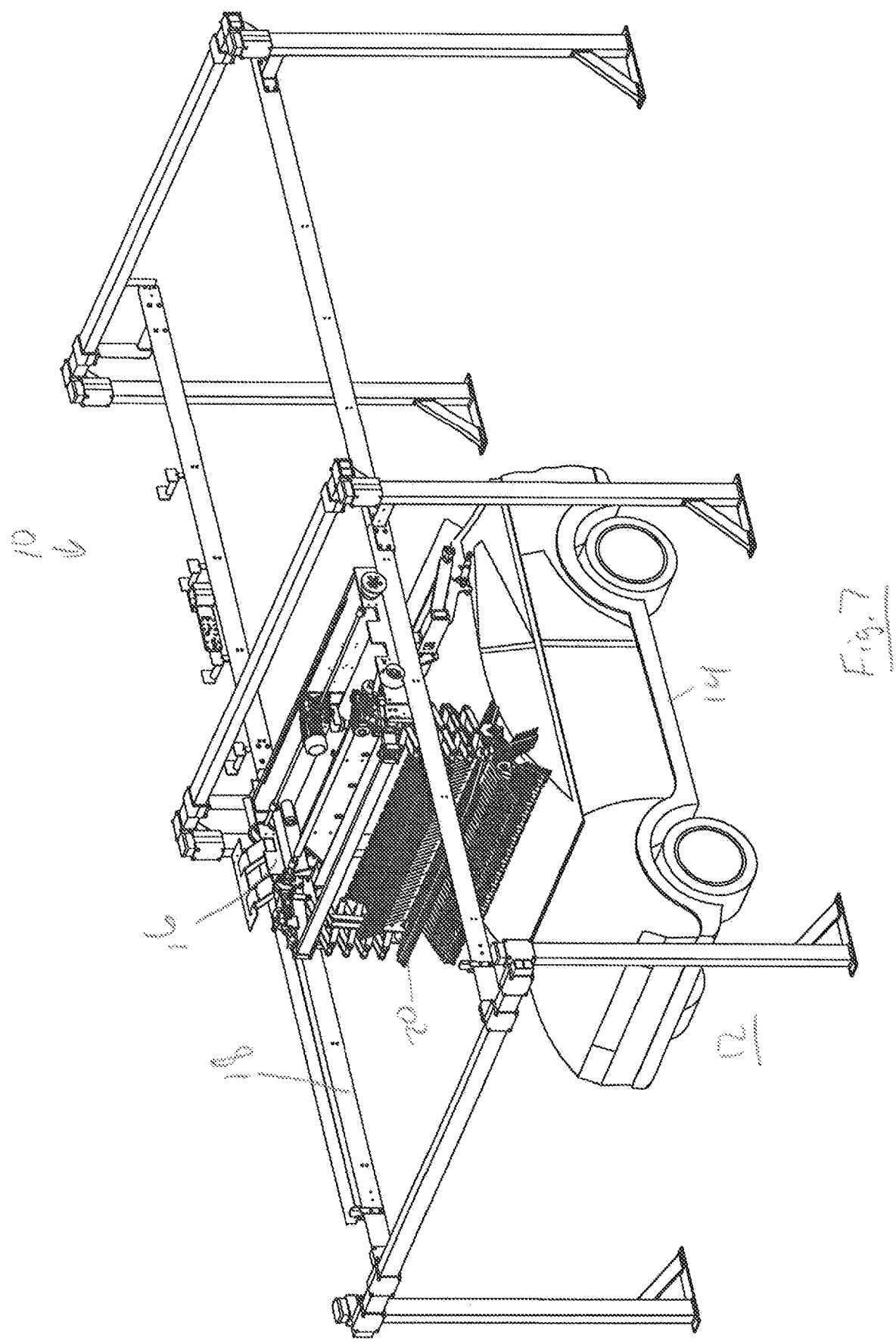
FIG. 7 illustrates a perspective view of system in the same state as FIG. 6.

As shown in FIGS. 6 and 7, following contact with the vehicle 14, the top brush 20 is retracted upward, and the frame 16 has moved rearward. This upward retraction may be made in response to the detected vehicle contour or in response to detecting that the vehicle 14 has contacted the top brush 20 and is pulling forward.

Figure 8:
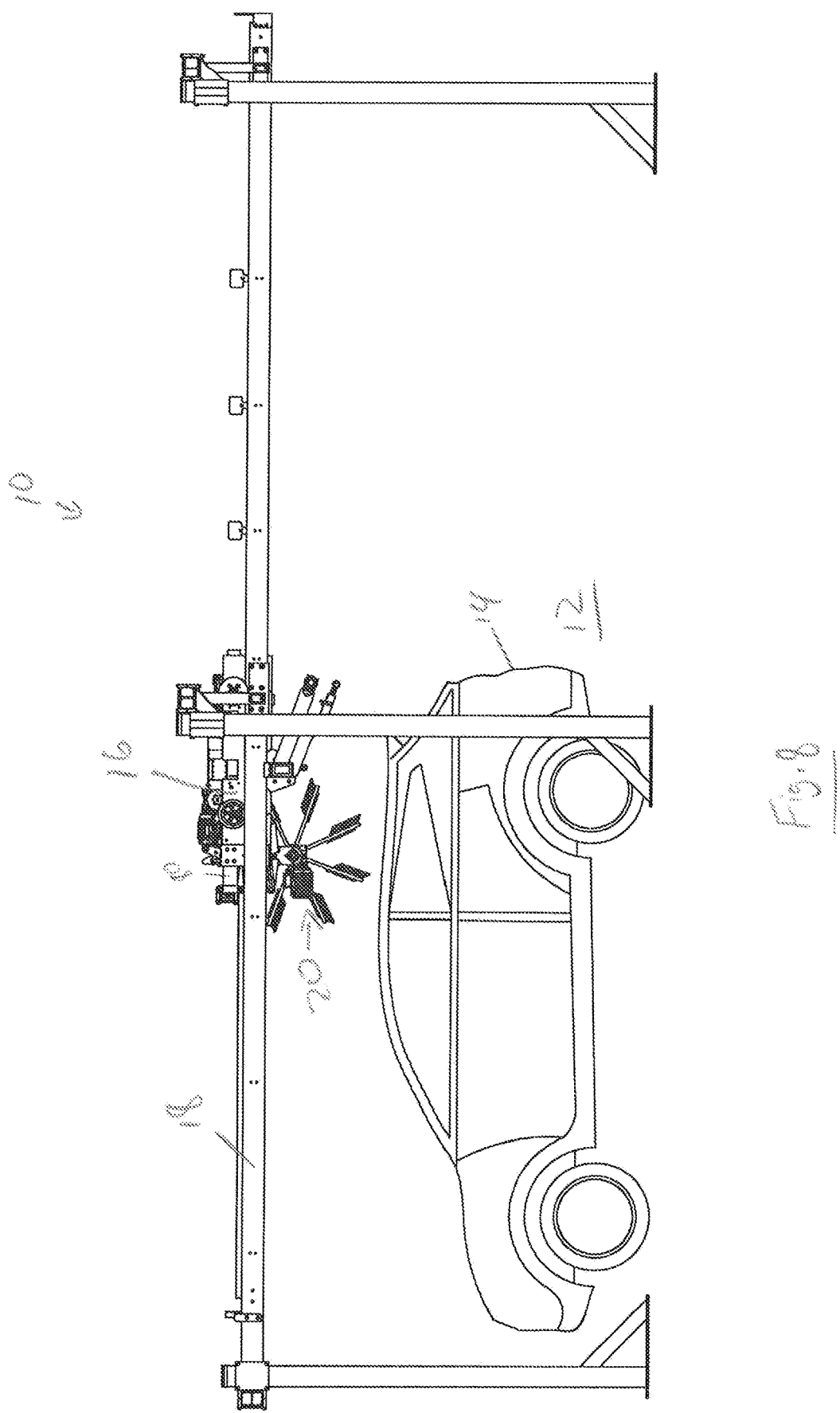
FIG. 8 illustrates the system with the top brush retracted fully and not pivoted, and the vehicle pulling further forward according to an aspect of the present disclosure.
Figure 9:
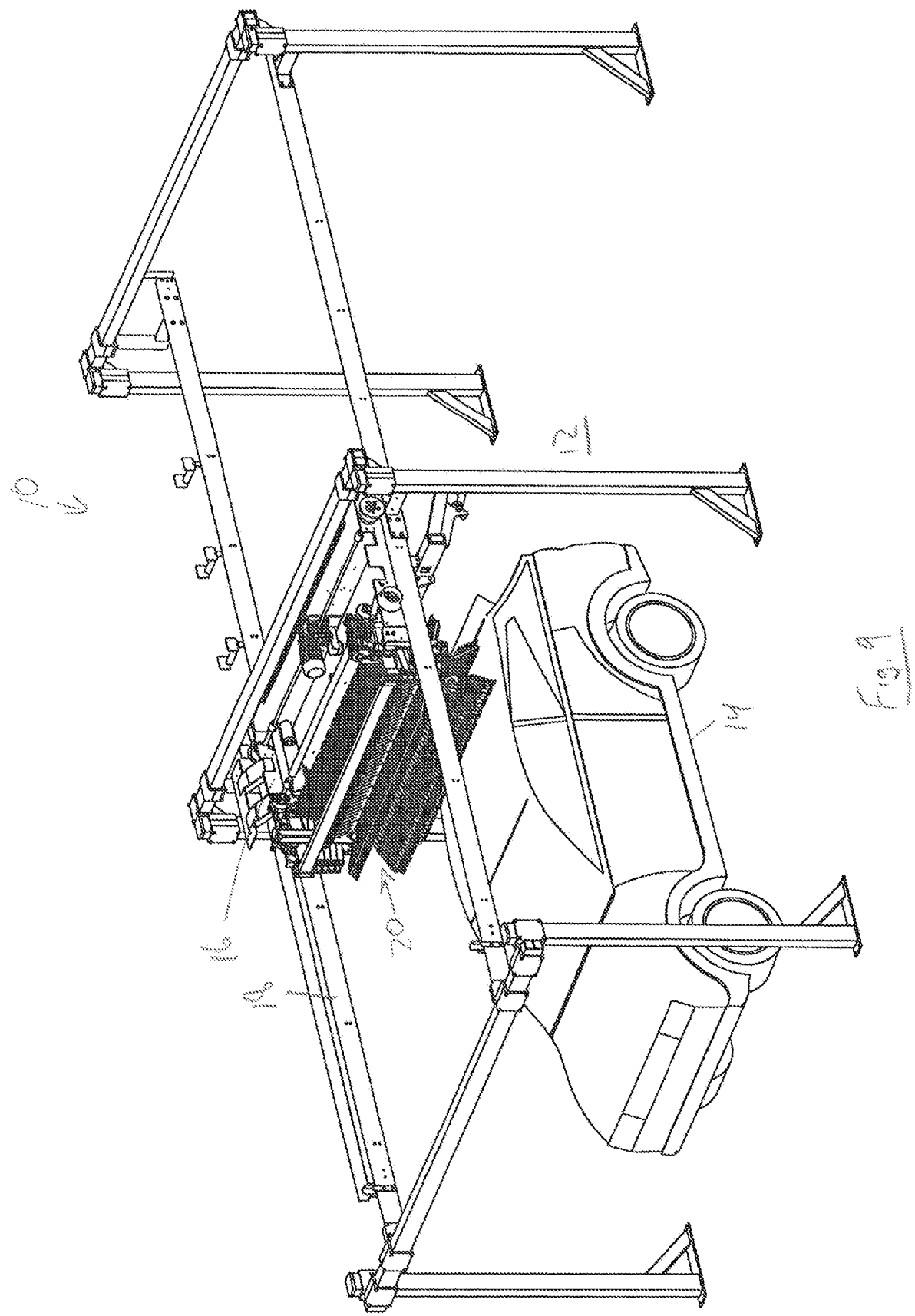
FIG. 9 illustrates a perspective view of system in the same state as FIG. 8.

FIGS. 8 and 9 illustrate the top brush 20 in a fully retracted state, which may be controlled based on the detected vehicle pull through to remove and protect the top brush 20 from further contact. The frame 16 has also moved further rearward. In FIGS. 8 and 9, the linear frame 21 is not pivoted.

Figure 10:
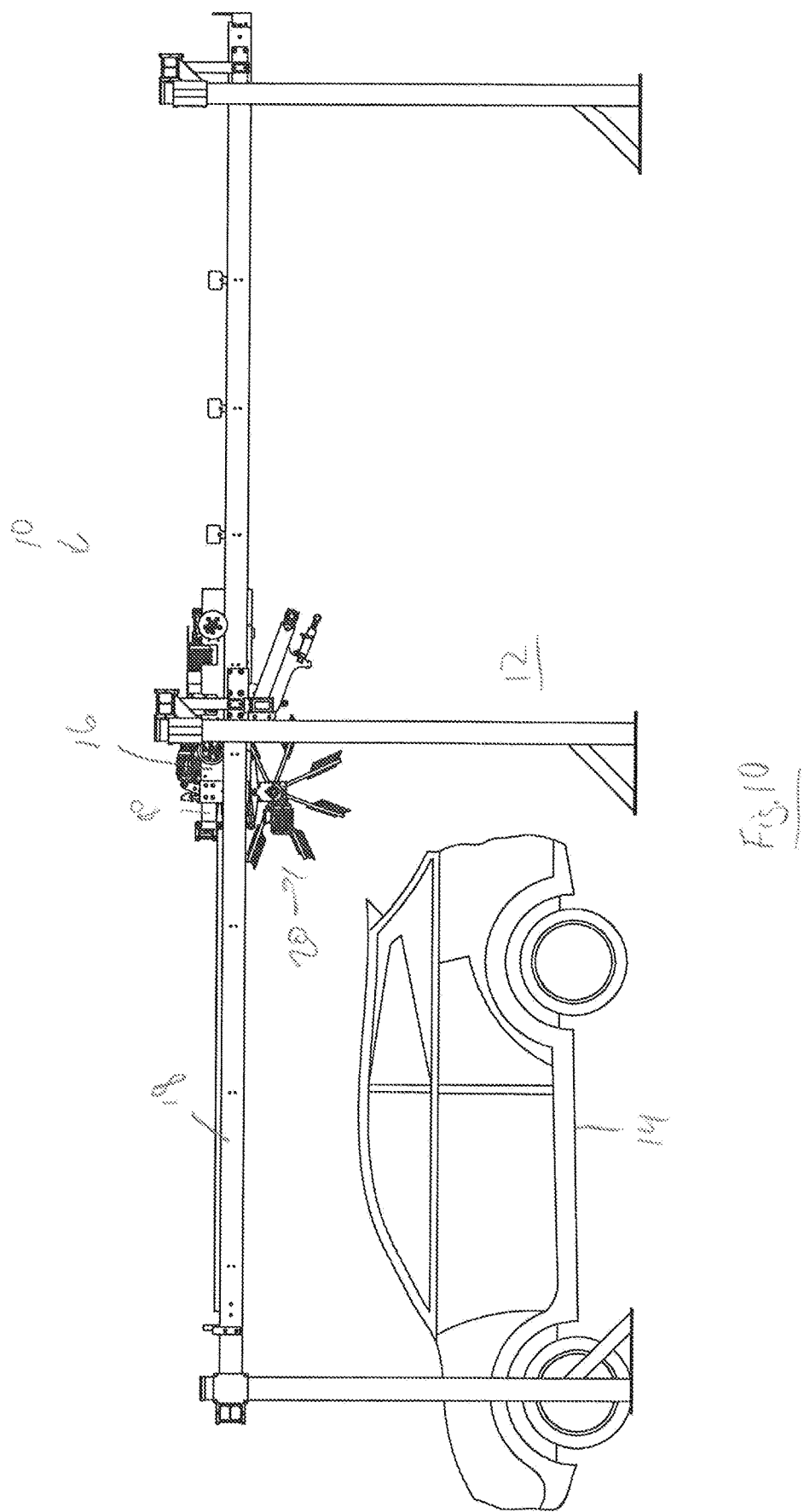
FIG. 10 illustrates the system with the frame moved further rearward and the vehicle pulled further forward according to an aspect of the present disclosure.
Figure 11:
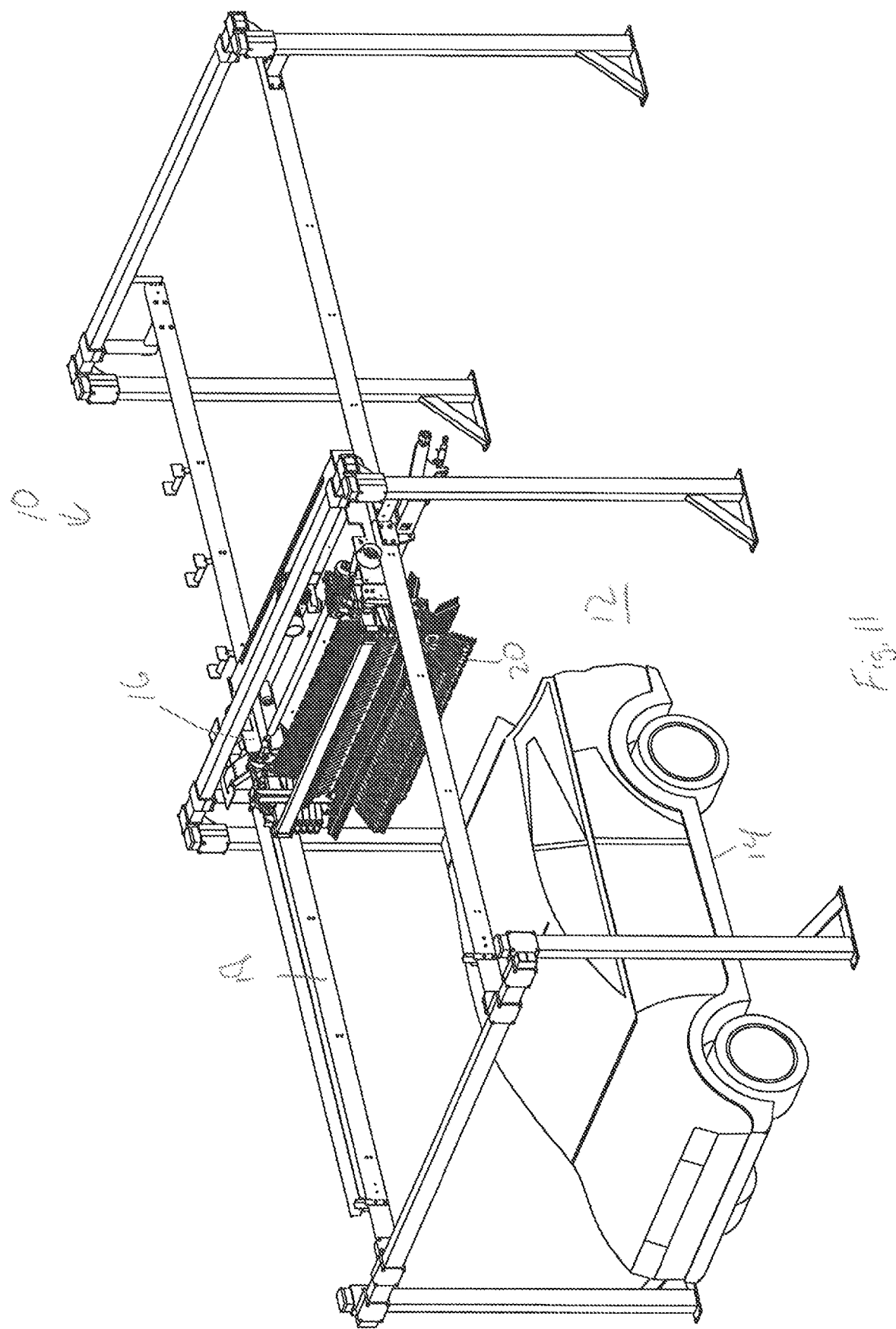
FIG. 11 illustrates a perspective view of system in the same state as FIG. 10.

FIGS. 10 and 11 illustrate the vehicle 14 pulling further forward, and the frame 16 having moved further rearward. The top brush 20 remains retracted, and the linear frame 21 is in a non-pivoted state relative to the frame 16.

FIGS. 4-11 illustrated how the system 10 may retract the top brush 20 as the vehicle 14 is pulling through. The frame 16 is shown moving rearward as the vehicle 14 pulls through. However, the frame 16 may also remain horizontally fixed as the vehicle 14 pulls through.

FIGS. 12-21 illustrate an example of the top brush 20 being controllable to move vertically and horizontally while the vehicle 14 remains stationary, and further illustrates how the pivoting of the brush may be controlled to provide improved contact with a rear surface of the vehicle 14.

Figure 12:
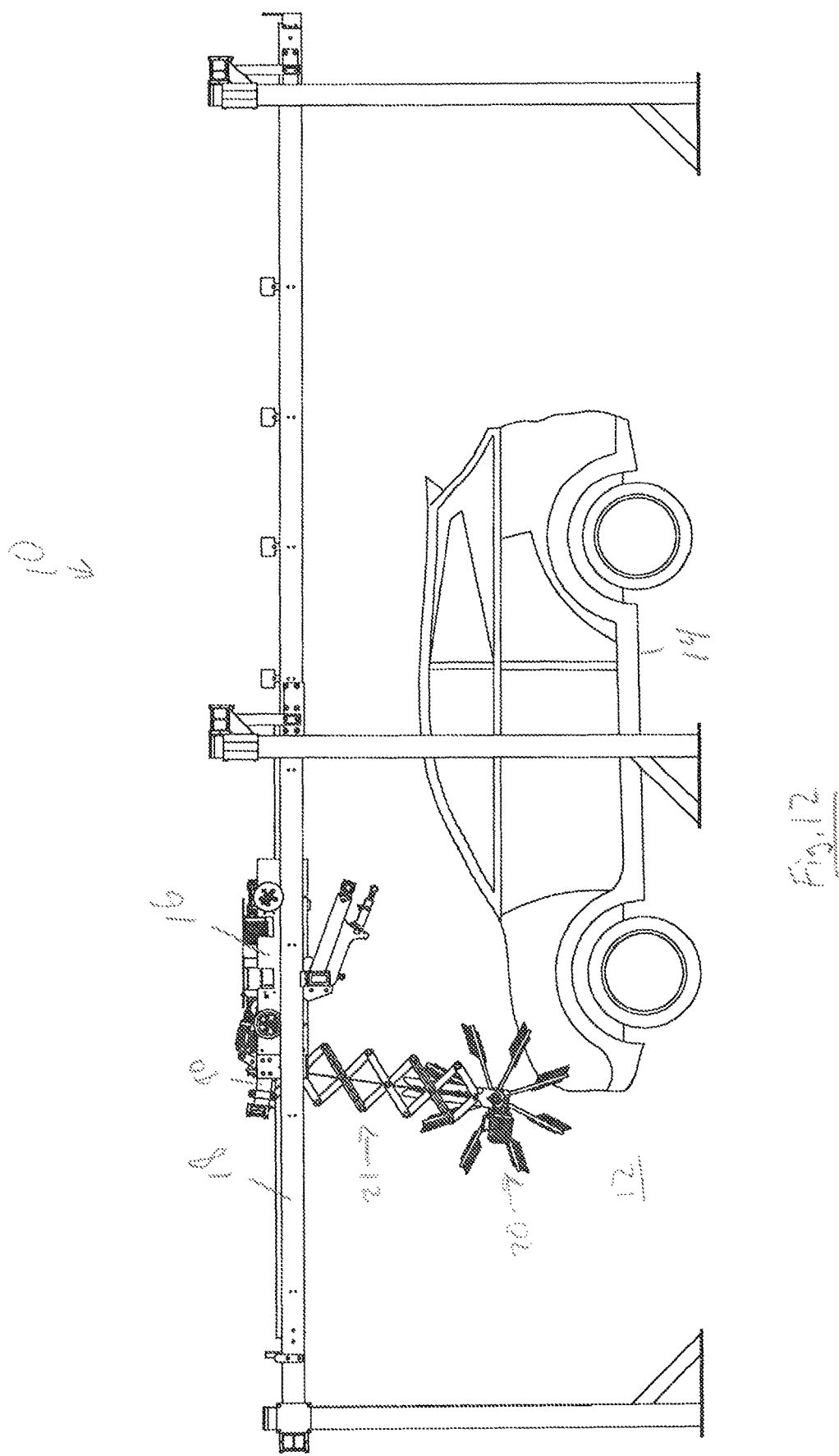
FIG. 12 illustrates the system in another state, with the top brush in a pivoted and extended position according to an aspect of the present disclosure.
Figure 13:
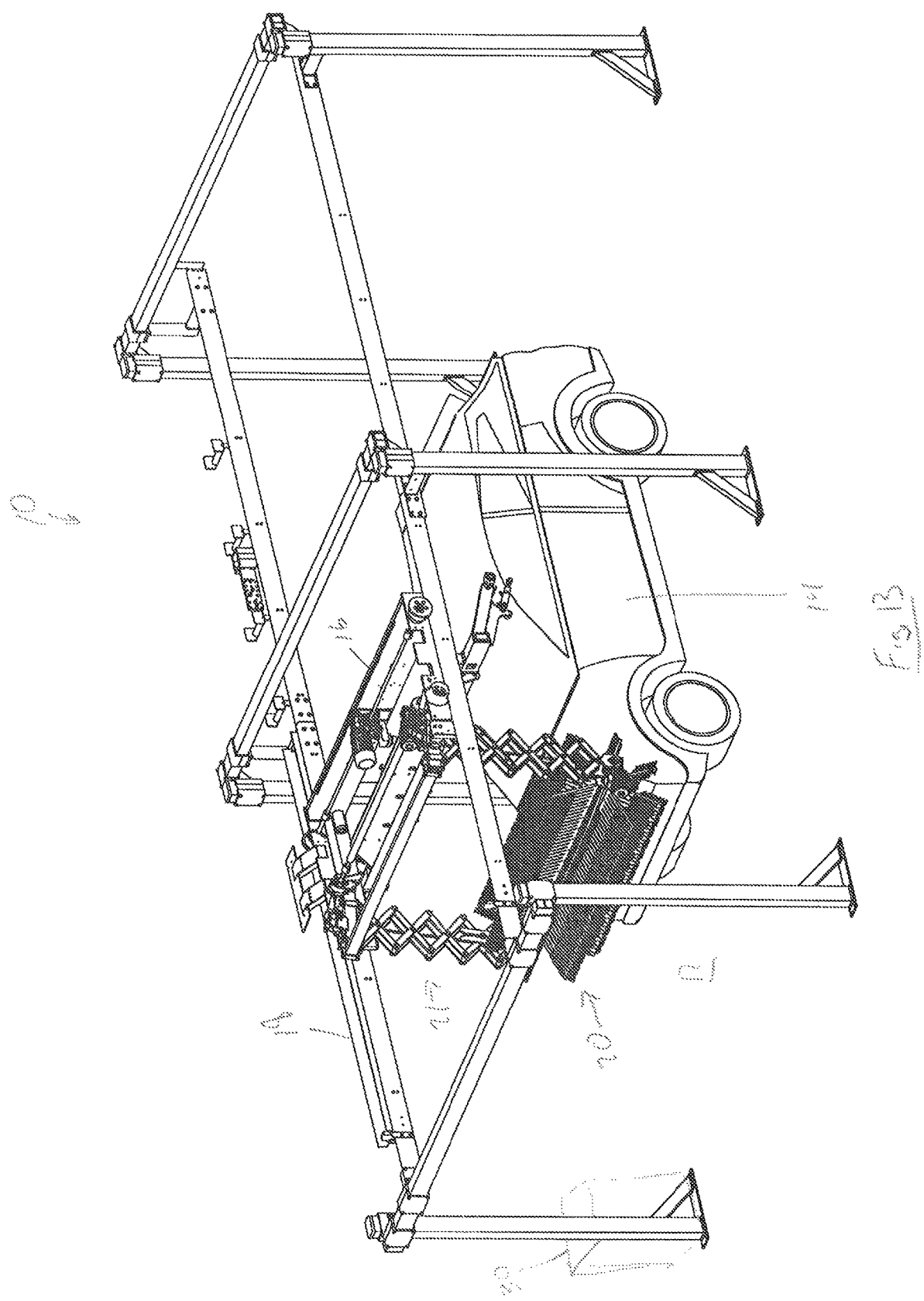
FIG. 13 illustrates a perspective view of system in the same state as FIG. 12.

With reference to FIGS. 12 and 13, the vehicle 14 disposed in the middle of the vehicle treatment area 12, and the top brush 20 is extended downward and in contact with the front of the vehicle 14. The top brush 20 is shown pivoted relative to vertical.

Figure 14:
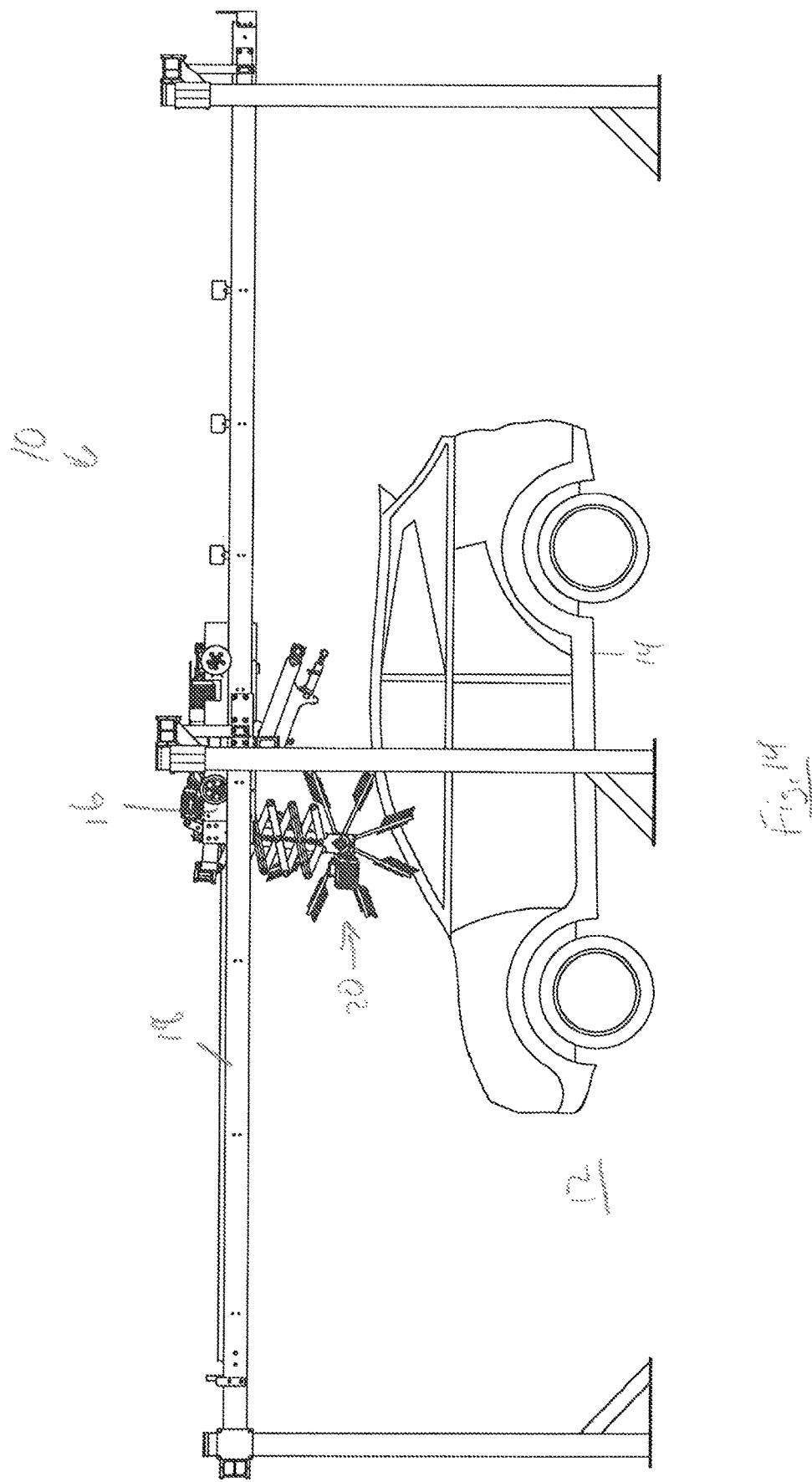
FIG. 14 illustrates the system in another state, with the top brush in a pivoted and partially retracted position according to an aspect of the present disclosure.
Figure 15:
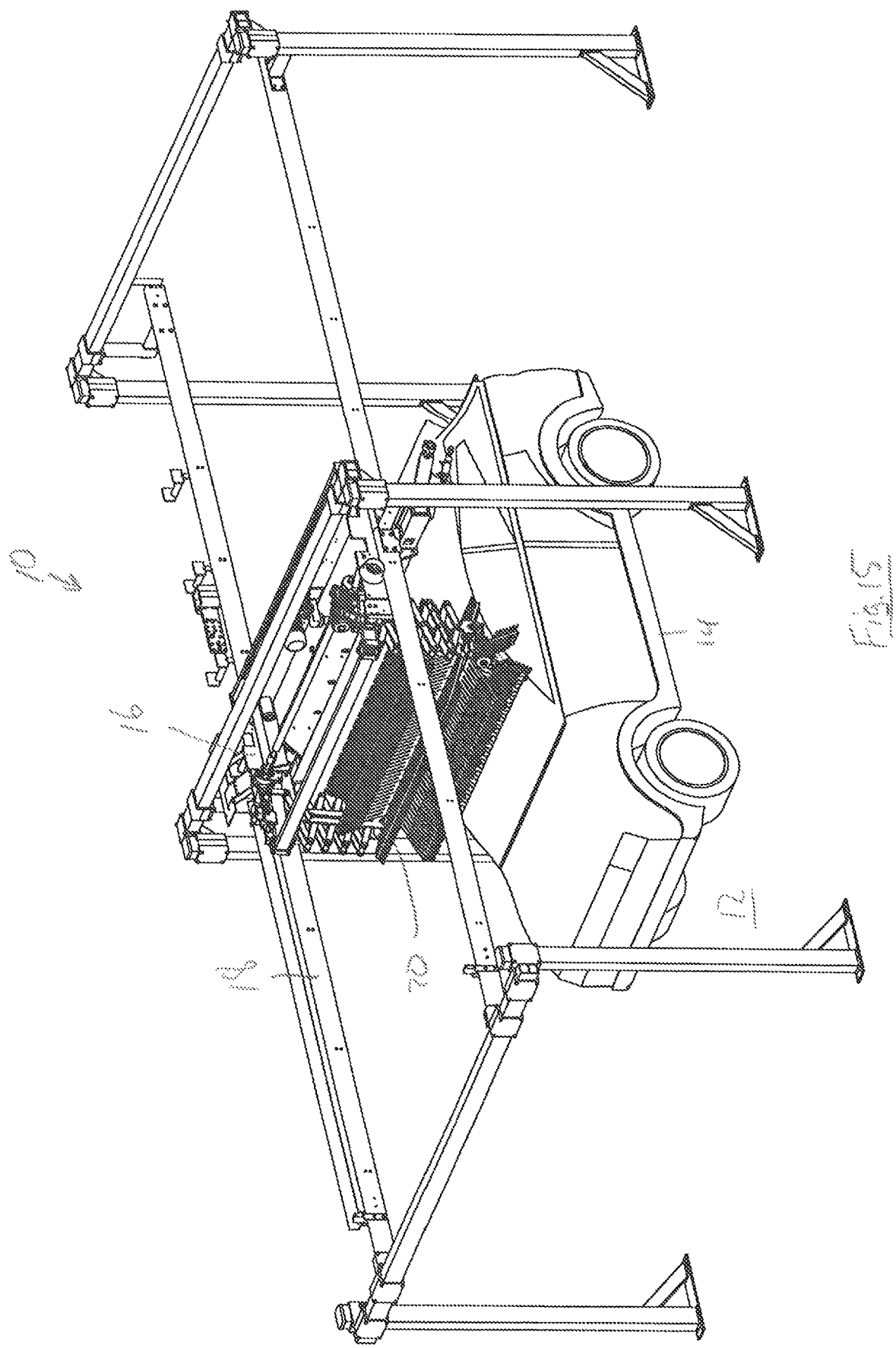
FIG. 15 illustrates a perspective view of system in the same state as FIG. 14.

FIGS. 14 and 15 show the top brush 20 in a partially extended position and the frame 16 having moved rearward, with the vehicle 14 in the same position as in FIGS. 12 and 13. The retraction of the top brush 20 relative to FIGS. 12 and 13 may be in response to signals from the control system based on the vehicle contour or in response to feedback from the top brush 20. As shown, the top brush 20 and pivot frame member 80 are in a pivoted position.

Figure 16:
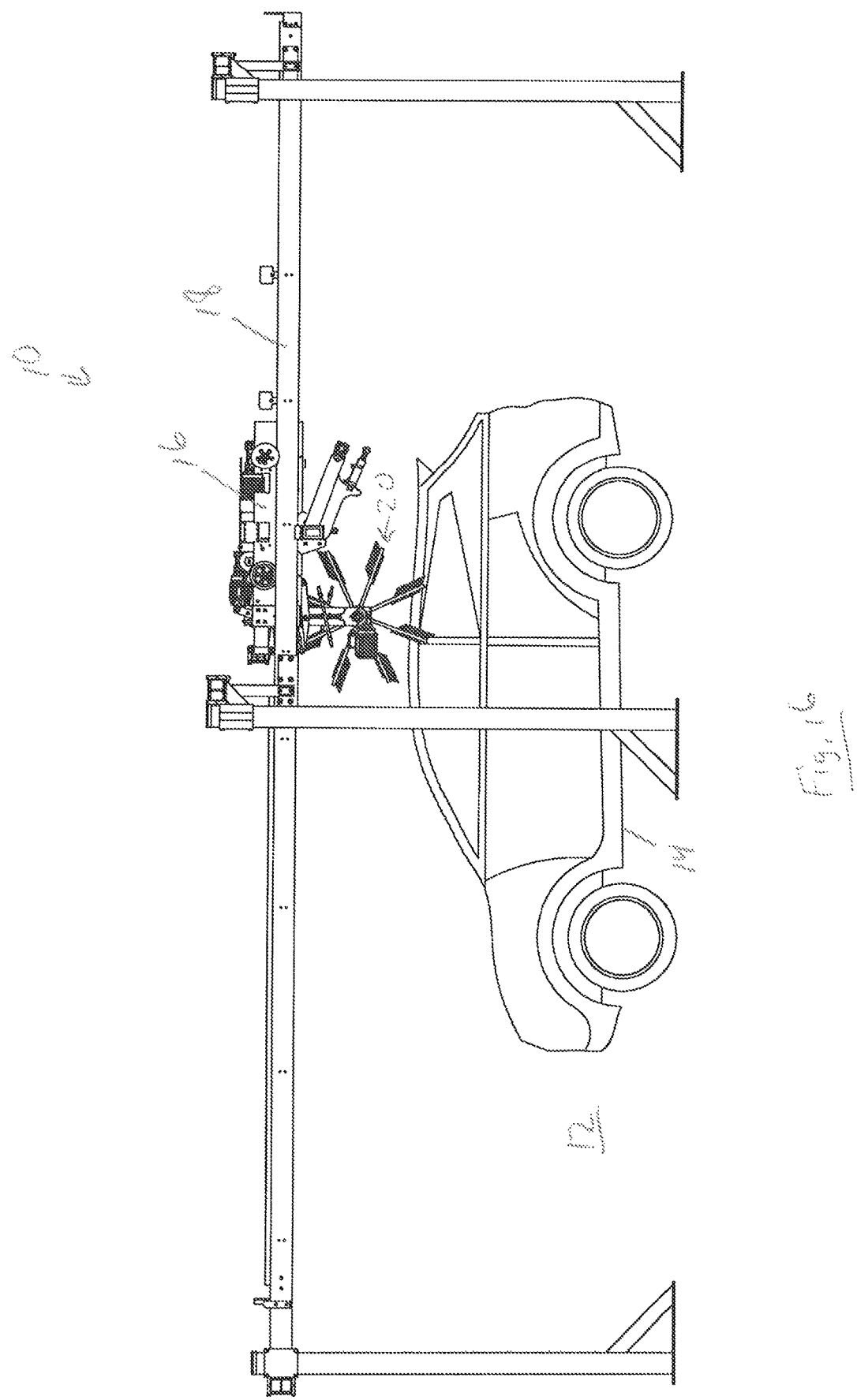
FIG. 16 illustrates the system in another state, with the top brush in a vertical and another retracted position according to an aspect of the present disclosure.
Figure 17:
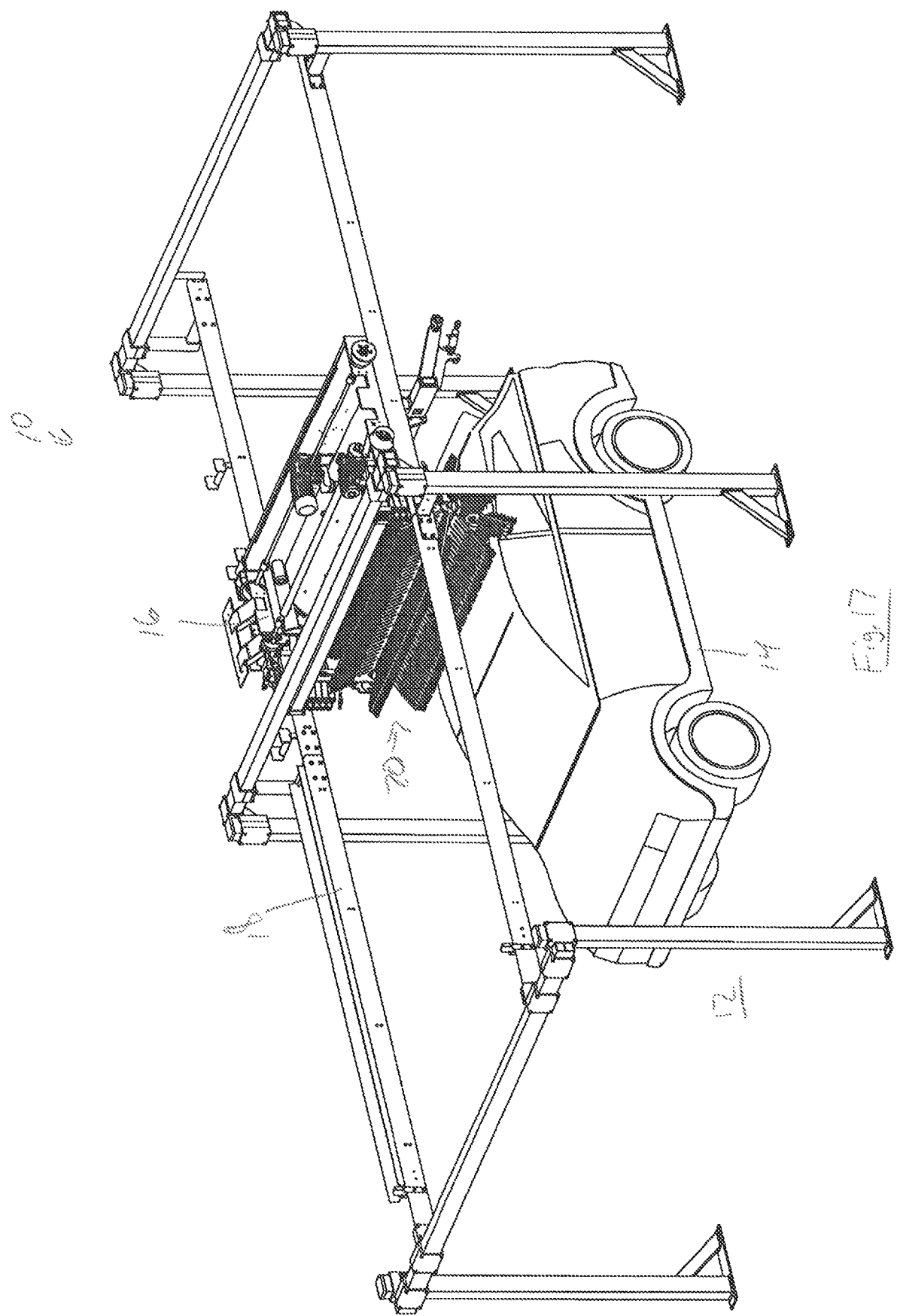
FIG. 17 illustrates a perspective view of system in the same state as FIG. 16.

FIGS. 16 and 17 illustrate a further rearward position of the top brush 20 and the frame 16, with the vehicle 14 remaining stationary. The top brush 20 is in a fully retracted position, and the linear frame 21 and the top brush 20 are in a non-pivoted state relative to the frame 16. In this position, the top brush is contacting the upper roof surface of the vehicle 14.

Figure 18:
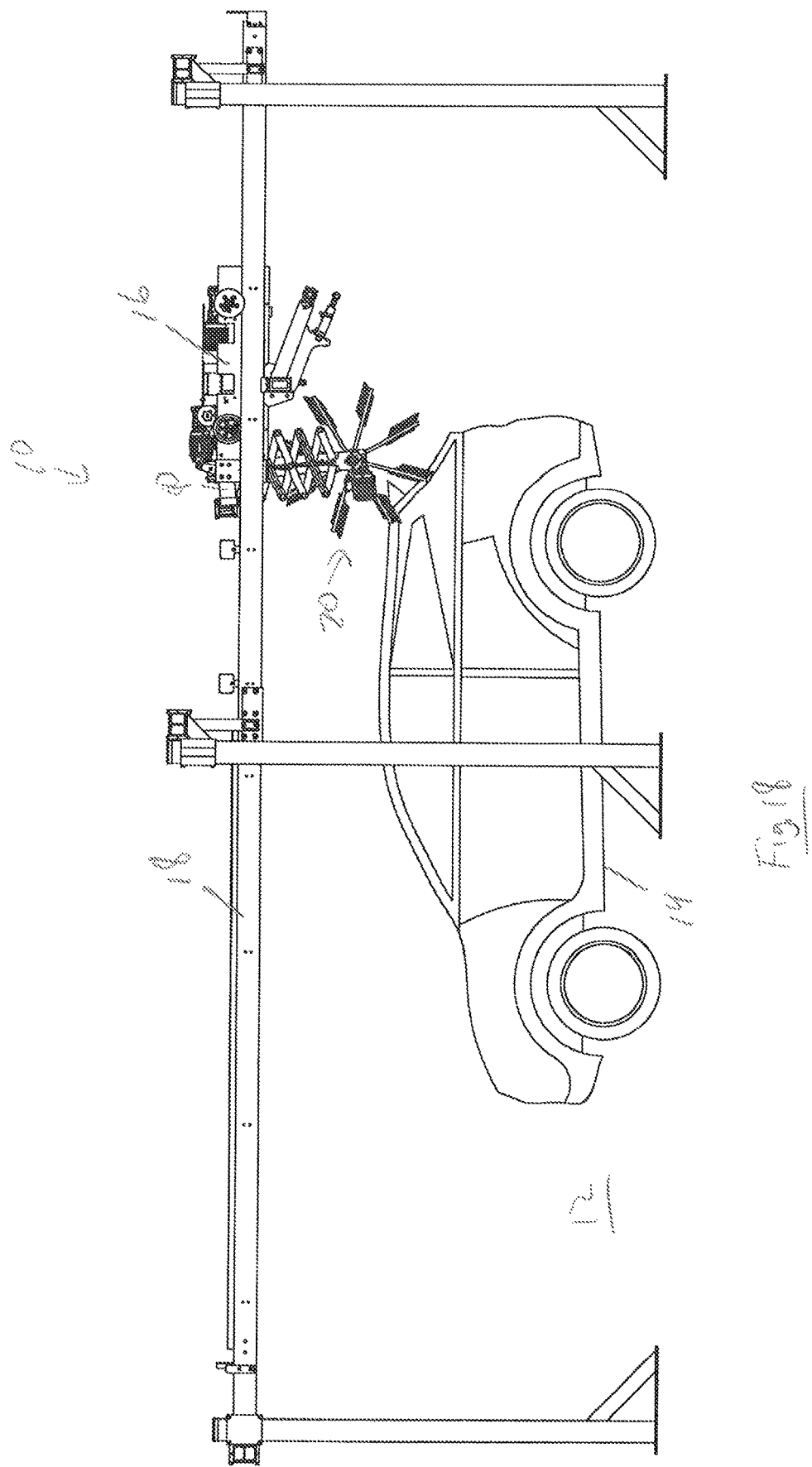
FIG. 18 illustrates the system in another state, with the top brush in a pivoted and another retracted position according to an aspect of the present disclosure.
Figure 19:
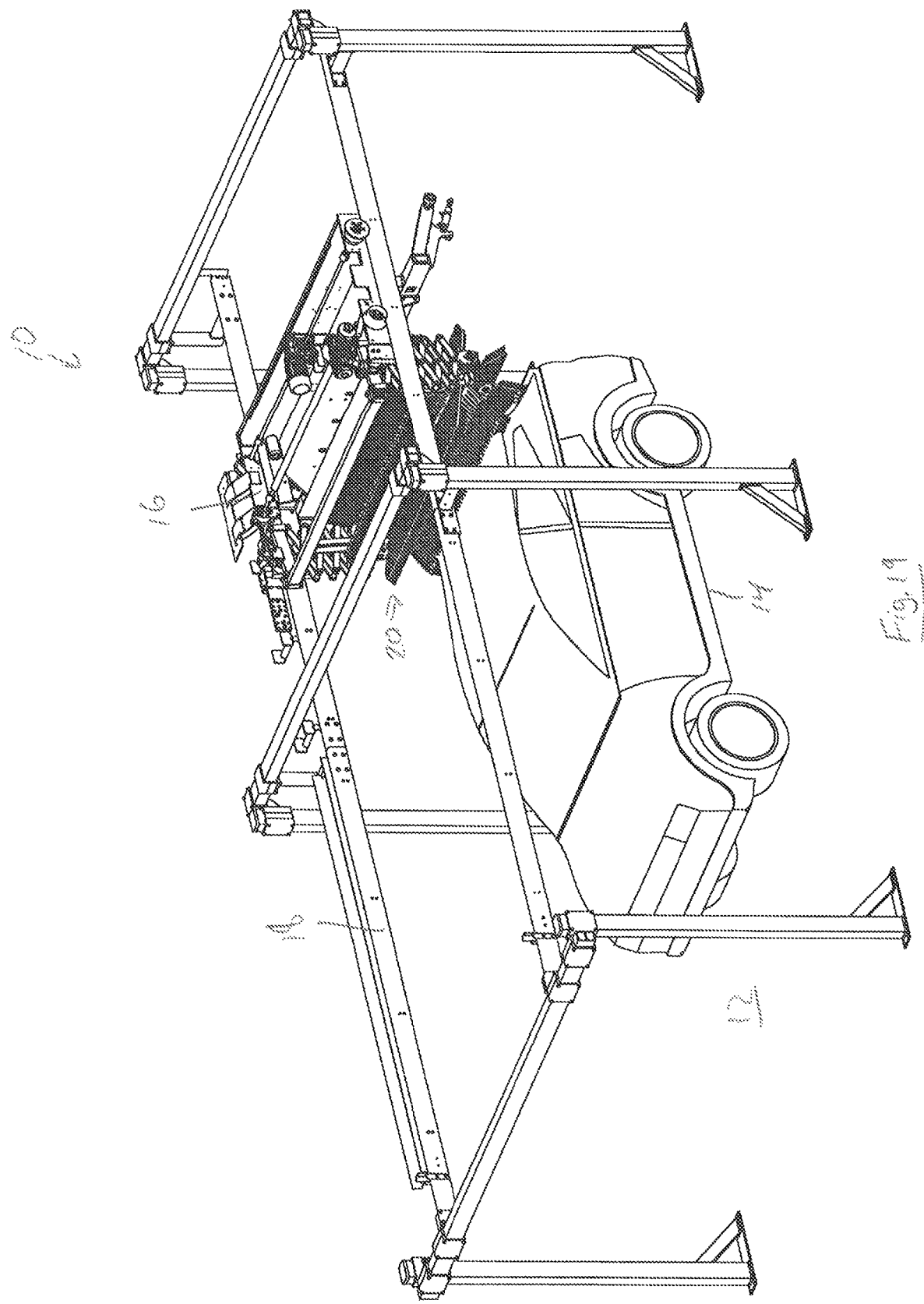
FIG. 19 illustrates a perspective view of system in the same state as FIG. 18.

FIGS. 18 and 19 illustrate a further rearward position of the top brush 20, frame 16, and linear frame 21. The top brush 20 is extended downward relative to FIGS. 16 and 17, and the top brush 20 and the linear frame 21 are pivoted relative to the frame 16. Unlike the previous pivoted positions of the top brush 20 and the linear frame 21, the top brush 20 and the pivot frame member 80 are pivoted in an opposite direction relative to vertical. This opposite pivot direction may be in response to following the rear contour of the vehicle 14, or in response to specific controls from the control system 30.

Figure 20:
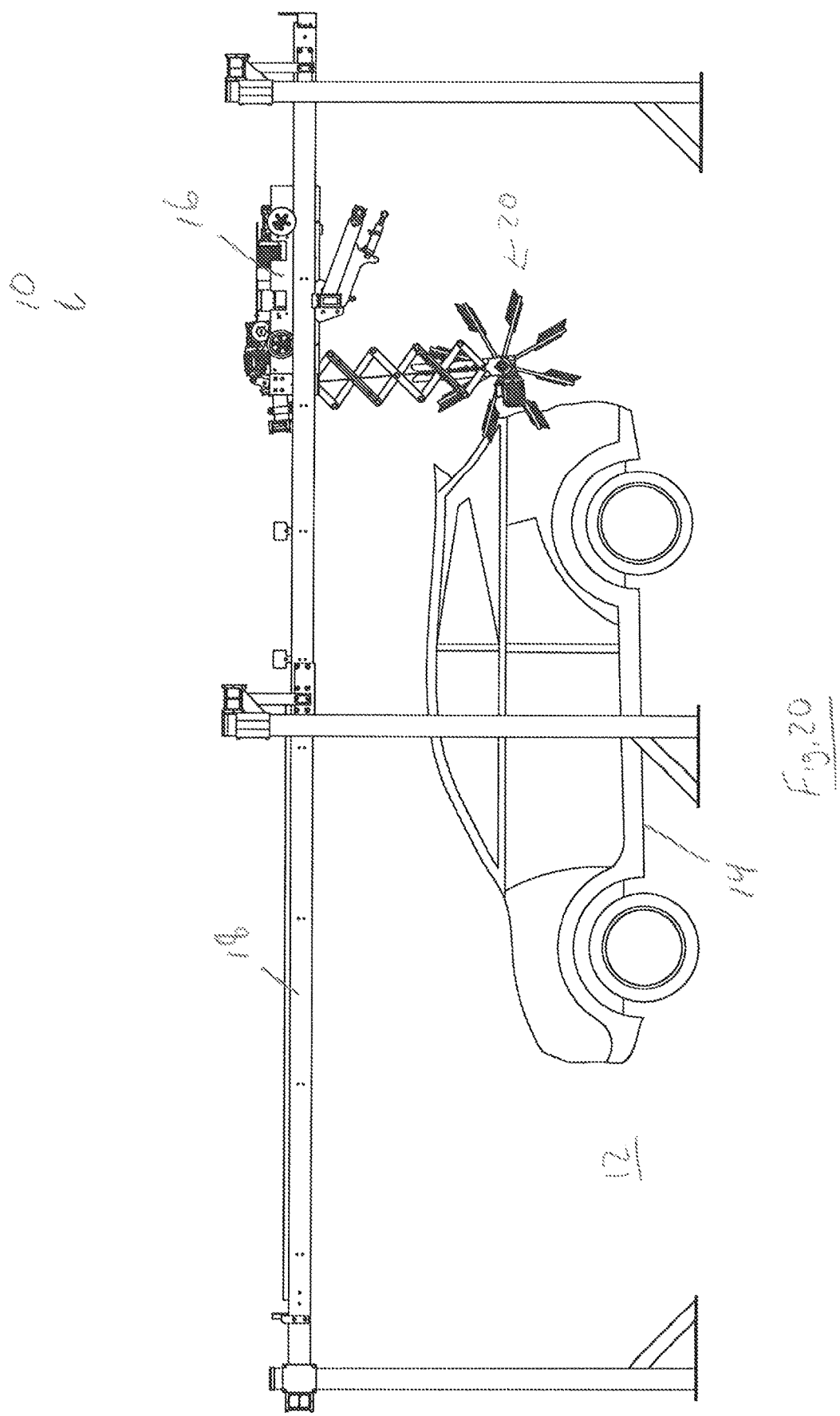
FIG. 20 illustrates the system in another state, with the top brush in a pivoted and another extended position according to an aspect of the present disclosure.
Figure 21:
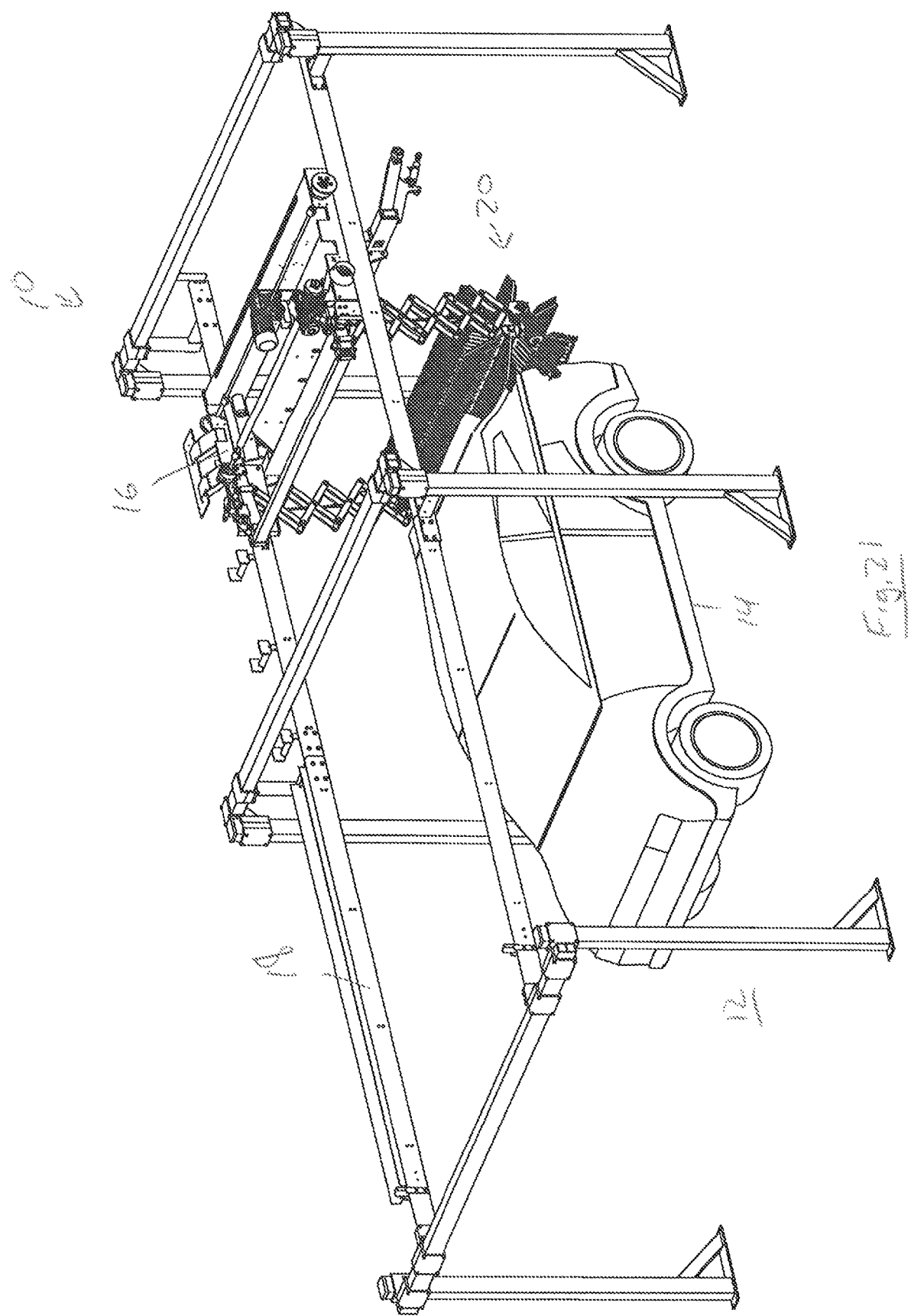
FIG. 21 illustrates a perspective view of system in the same state as FIG. 20.

FIGS. 20 and 21 illustrate a further rearward position of the top brush 20, the linear frame 21, and the frame 16, and the top brush 20 is extended further downward relative to the FIGS. 18 and 19. The top brush 20 and the linear frame 21 are pivoted in the same direction as in FIGS. 18 and 19. This position allows for further cleaning of the rear surface, and provides an improved wash.

In the above description related to FIGS. 12-21, the vehicle 14 remained stationary within the vehicle treatment area 12. However, it will be appreciated that the above described movement of the top brush 20 relative to the vehicle body 14 may still occur even if the vehicle 14 is moving. The top brush 20 may still be controlled to be retracted and extended based on the vehicle contour and/or feedback.

The scissor mechanism 60 was shown throughout the figures, but it will be appreciated that other linearly extendable mechanisms may be used that may be coupled to the pivot frame member 80 or the frame 16 that allows for vertical movement to be combined and controlled to provide an improved wash over front, top, and rear surfaces.

Figure 29:
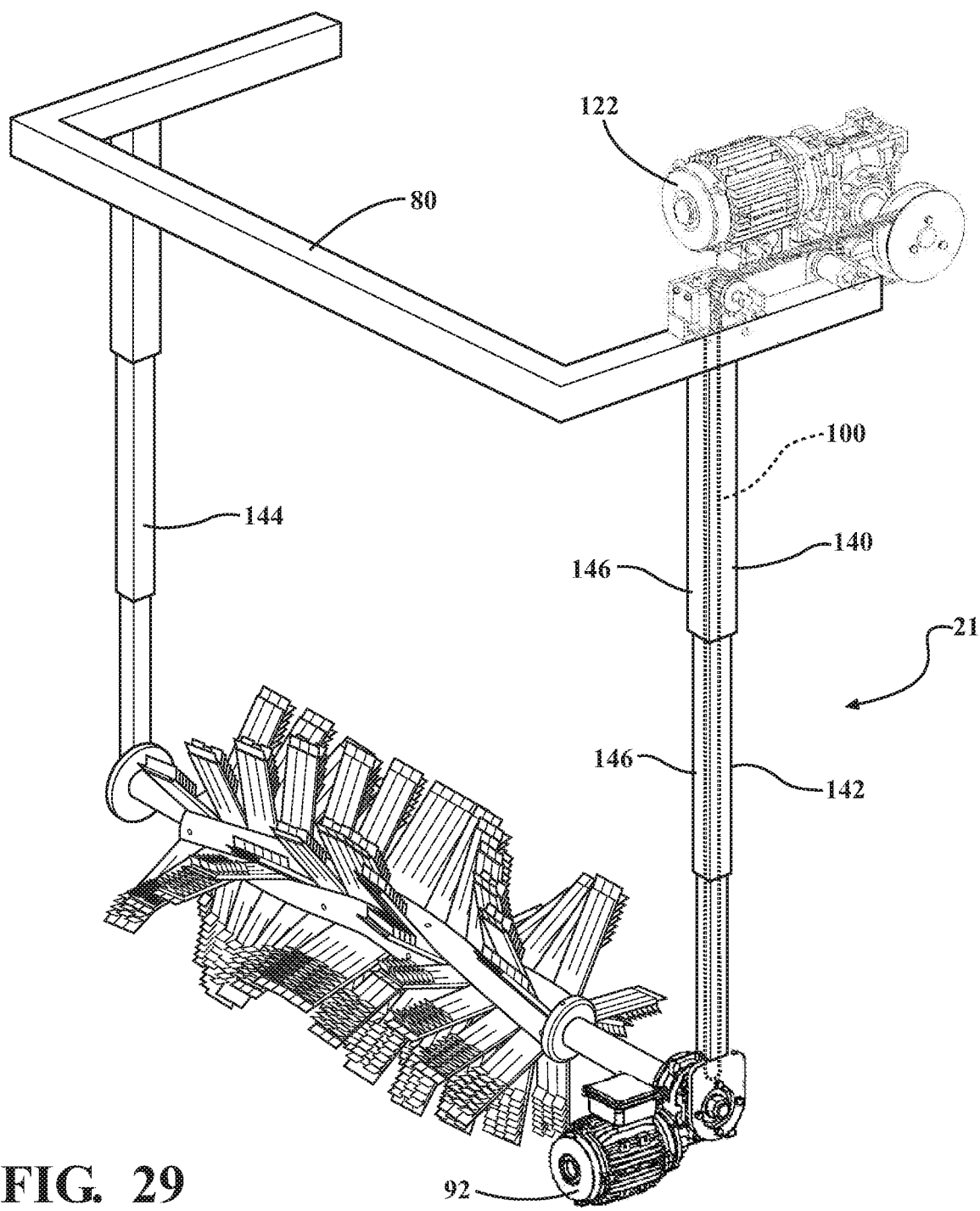
FIG. 29 illustrates another aspect of the vertical translation mechanism according to an aspect of the present disclosure.

With reference to FIG. 29, in another aspect, the linear frame 21 may be in the form of a telescoping rod mechanism 140 that is coupled to the frame 16, either with or without pivoting ability relative to the frame 16. The telescoping rod mechanism 140 may include first and second telescoping arms 142, 144 disposed on opposite sides of the vehicle treatment area 12, similar to the arms 62, 64 of the scissor support mechanism 60. The above described functionality of the scissor support mechanism 60 may be applied to the telescoping rod system 140. For example, the telescoping rod system 140 may pivot about a pivot point, if desired. The belt support 100 and motor 122 may be used to raise and lowered the telescoping arms 142, 144, with the belt support 100 attached to a lower end connection of the arms 142, 144.

The arms 142, 144 may be in the form of a plurality of concentrically arranged tubes 146 with decreasing diameters and each with a height generally corresponding to the collapsed height of the rod mechanism 140. The number of tubes 146 may be determined based on the overall extended length that is desired. The arms 142, 144 may also be in the form of telescoping box-like structures, or other outer profiles that can be nested within each other.

The telescoping rod mechanism 140 may also be actuated by a linear actuator, or may include integrated linear actuator mechanisms and be directly actuatable.

Figure 30:
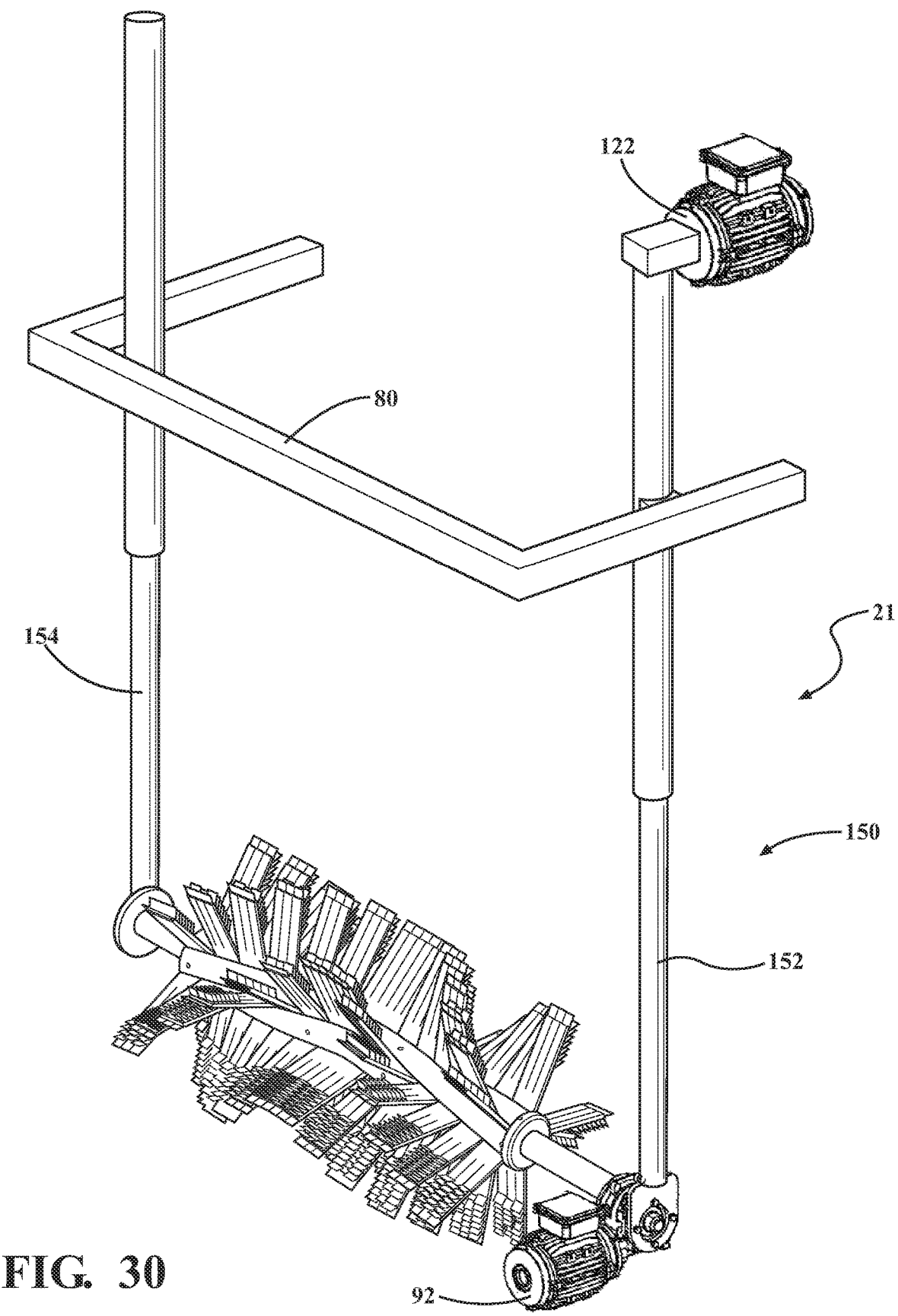
FIG. 30 illustrates yet another aspect of the vertical translation mechanism according to another aspect of the present disclosure.

With reference to FIG. 30, in another aspect, a linear actuator mechanism 150 may be used to control the vertical location of the top brush 20. In this approach, the linear actuator mechanism 150 may include first and second rods 152, 154 located on opposite sides of the vehicle, with the top brush extending between the bottom ends thereof. The rods 152, 154 may be hydraulic, pneumatic, or magnetically controlled and may be actuated and controlled to drive the top brush 20 downward and upward on demand. However, in this approach, the compressed length may be greater than the scissor mechanism 60 or the telescoping rod system 140, and the linear actuator 150 may extend above the pivot frame member 80 and/or the frame 16.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A vehicle washing system comprising:
a frame disposed adjacent a vehicle treatment area configured to receive a vehicle to be cleaned, the frame configured to support one or more vehicle treatment components;
a linear guide coupled to the frame, wherein the linear guide is adjustable in a first linear direction between a collapsed position having a first length and an extended position having a second length and configured to adjust relative to the frame toward and away from the vehicle treatment area; and
a brush coupled to a lower end of the linear guide such that the brush can be raised and lowered with respect to a vehicle in the vehicle treatment area as the linear guide reciprocates between the collapsed position state and the extended position, wherein the brush is rotatable about a central axis thereof;
a drive member extending in the first linear direction and directly attached to the brush, wherein the position of the brush is directly controlled by actuation and positioning of the drive member; and
wherein the linear guide is positioned dependent on the position of the brush controlled by the drive member.

2. The system of claim 1, wherein the linear guide includes a plurality of telescoping portions, wherein the telescoping portions each move in the first linear direction between the collapsed position and the extended position.

3. The system of claim 1, wherein the brush is fixed to a lower portion of the linear guide, and the brush moves linearly along with the lower portion.

4. The system of claim 1, wherein the drive member comprises a linear actuator.

5. The system of claim 1, wherein the drive member comprises a hydraulic system.

6. The system of claim 1, wherein the drive member comprises a windable belt.

7. The system of claim 1, wherein the linear guide comprises a scissor mechanism, and the brush is attached to the lower end of the scissor mechanism.

8. The system of claim 1, wherein when the linear guide is retracted upward in the collapsed position, the linear guide does not extend below the first brush.

9. The system of claim 1, wherein the drive member is integral with the linear guide.

10. The system of claim 1, wherein the linear guide reciprocates between the collapsed position and the extended position in response to actuation of the drive member, wherein the drive member is separate from the linear guide.

11. The system of claim 1, wherein the brush is raised and lowered along with extension and retraction of the linear guide.

12. The system of claim 1, wherein the brush includes a brush support flange secured at the lower end of the linear guide, wherein the brush support flange carries and supports the brush such that the brush is not supported directly by the linear guide, wherein the drive member is attached to the brush support flange.

13. A vehicle washing system, comprising:
a reciprocal guide system disposed adjacent a vehicle treatment area, which is configured to receive a vehicle to be cleaned;
the reciprocal guide system being moveable between a first position extending into the vehicle treatment area and a second position removed from the vehicle treatment area; and
a vehicle treatment component coupled to the reciprocal guide system, whereby the vehicle treatment component is configured to be moved toward and away from the vehicle treatment area together with the reciprocal guide system;
wherein the vehicle treatment component is directly attached to a drive member separate from the reciprocal guide system, wherein movement of the drive member moves the vehicle treatment component, and the reciprocal guide system extends and retracts in response to movement of the vehicle treatment component caused by the drive member;
wherein the reciprocal guide system does not extend below the vehicle treatment component.

14. The system of claim 13, wherein the reciprocal guide system is secured to an overhead structure and wherein it is linearly and vertically reciprocal such that it can be raised and lowered with respect to the vehicle treatment area.

15. The system of claim 14, wherein the vehicle treatment component is a rotating brush, having an axis of rotation that is generally horizontal.

16. The system of claim 15, wherein the reciprocal guide system is collapsible vertically to guide the brush with respect to the vehicle treatment area.

17. The system of claim 16, wherein the reciprocal guide system is a scissor mechanism and wherein the brush is secured to a lower end of the scissor mechanism to move the brush vertically.

18. The system of claim 16, wherein the reciprocal guide system includes multiple portions that are in telescopic communication to effect vertical movement of the reciprocal guide system between the first position and the second position.

19. The system of claim 18, wherein the brush is coupled to the reciprocal guide system.

20. The system of claim 19, wherein the drive member is a vertical drive mechanism.

21. The system of claim 20, wherein the vertical drive mechanism includes a windable belt drive system.

22. The system of claim 13, wherein the vehicle treatment component includes a support flange, wherein the support flange carries and supports the vehicle treatment component such that the vehicle treatment component is not supported directly by the reciprocal guide system, wherein the drive member is attached to the support flange.

23. A method for treating a vehicle body in a vehicle washing system, the method comprising:
providing a vehicle having a vehicle body within a vehicle treatment area of a vehicle washing system;
moving a guide system downward toward the vehicle body;
moving a top brush coupled to the guide system downward toward the vehicle body;
moving the top brush horizontally relative to the vehicle body;
moving the guide system upward away from the vehicle body;
moving the top brush upward away from the vehicle body;
wherein the top brush is actuated by a drive member that is separate from the guide system;
wherein movement of the guide system occurs in response to movement of the top brush, wherein the guide system expands and retracts along with the movement of the top brush.

24. The method of claim 23, wherein the top brush is vertically fixed relative to the guide system, and the top brush moves along with the guide system and the position of the guide system is dependent on the position of the top brush.

25. The method of claim 23, wherein the guide system is a telescoping guide system, wherein the top brush is fixed to a bottom portion of the telescoping guide system.

26. The method of claim 23, wherein the guide system comprises a scissor mechanism, wherein the top brush is fixed to a bottom portion of the scissor mechanism.

27. The method of claim 23, wherein the guide system has a first position and a second position, wherein a lower portion of the guide system and the top brush is higher in the first position than the second position.

28. The method of claim 27, wherein, in the first position, the lower portion does not extend below the top brush.

* * * * *